United States Patent [19]
Otten

[11] Patent Number: 5,835,857
[45] Date of Patent: Nov. 10, 1998

[54] POSITION DETERMINATION FOR REDUCING UNAUTHORIZED USE OF A COMMUNICATION SYSTEM

[75] Inventor: David D. Otten, Redondo Beach, Calif.

[73] Assignee: Celsat America, Inc., Torrance, Calif.

[21] Appl. No.: 751,651

[22] Filed: Nov. 18, 1996

Related U.S. Application Data

[63] Continuation of Ser. No. 255,341, Jun. 7, 1994, abandoned, Continuation-in-part of Ser. No. 145,246, Oct. 28, 1993, Pat. No. 5,446,756, which is a continuation-in-part of Ser. No. 781,972, filed as PCT/US91/01852 Mar. 19, 1991, Pat. No. 5,339,330, which is a continuation-in-part of Ser. No. 495,497, Mar. 19, 1990, Pat. No. 5,073,900.

[51] Int. Cl.$^6$ ........................................................ H04Q 7/00
[52] U.S. Cl. ........................... 455/410; 342/457; 342/387; 455/456
[58] Field of Search ..................................... 455/410, 456, 455/411, 403; 342/357, 47, 88, 125, 450, 458, 457, 387

[56] References Cited

U.S. PATENT DOCUMENTS

| | | | |
|---|---|---|---|
| 4,728,959 | 3/1988 | Maloney et al. | 342/457 |
| 4,742,357 | 5/1988 | Rackley | 342/457 |
| 5,023,900 | 6/1991 | Tayloe et al. | 455/424 |
| 5,293,645 | 3/1994 | Sood | 455/456 |
| 5,319,374 | 6/1994 | Desai et al. | 342/387 |
| 5,499,032 | 3/1996 | Kelley et al. | 342/457 |
| 5,506,864 | 4/1996 | Schilling | 342/457 |
| 5,612,703 | 3/1997 | Mallinckrodt | 342/457 |

Primary Examiner—Dwayne D. Bost
Assistant Examiner—Tracy M. Legree
Attorney, Agent, or Firm—Drummond & Duckworth

[57] ABSTRACT

Methods for operating a wireless communications system provided for reducing the use of the system by unauthorized users by establishing the geographical location of selected users, comparing this location with the known locations of authorized users and denying service to the selected user if the selected user's location does not correspond to the known location of authorized users. Seamless hand-over of a user between nodes of the communication system is effected by periodically recomputing a algorithm which determines a preferred node for communication with the user. When the algorithm indicates that another node is preferred, a call initiation handshake is established between the user and the preferred node, while still maintaining communication with the original node. Communication between the user and the first node is not interrupted until the user establishes a communication "lock" with the second node. Passive intermodulation interference of signals transmitted and received by nodes of a multi-satellite node system is eliminated by using certain of the satellite nodes for transmit-only and other of the satellite nodes for receive-only operation. In another embodiment PIM interference is eliminated by time duplexing the signals transmitted and received by a satellite's antenna. PIM interference is also reduced by assigning unique portions of each transmitter subband and each receiver subband to each of the satellite nodes.

2 Claims, 17 Drawing Sheets

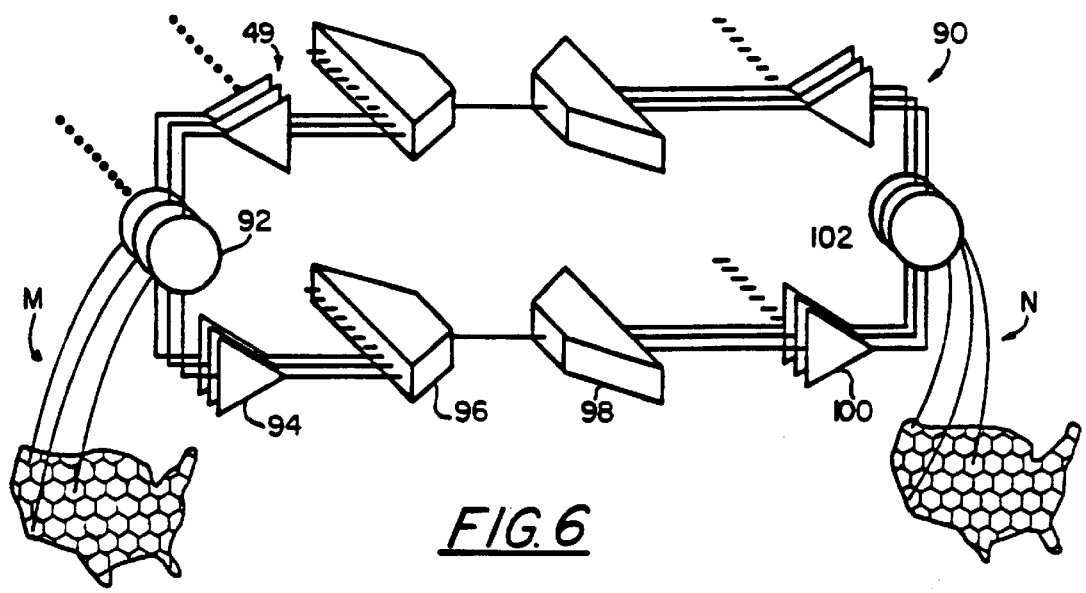
FIG. 6
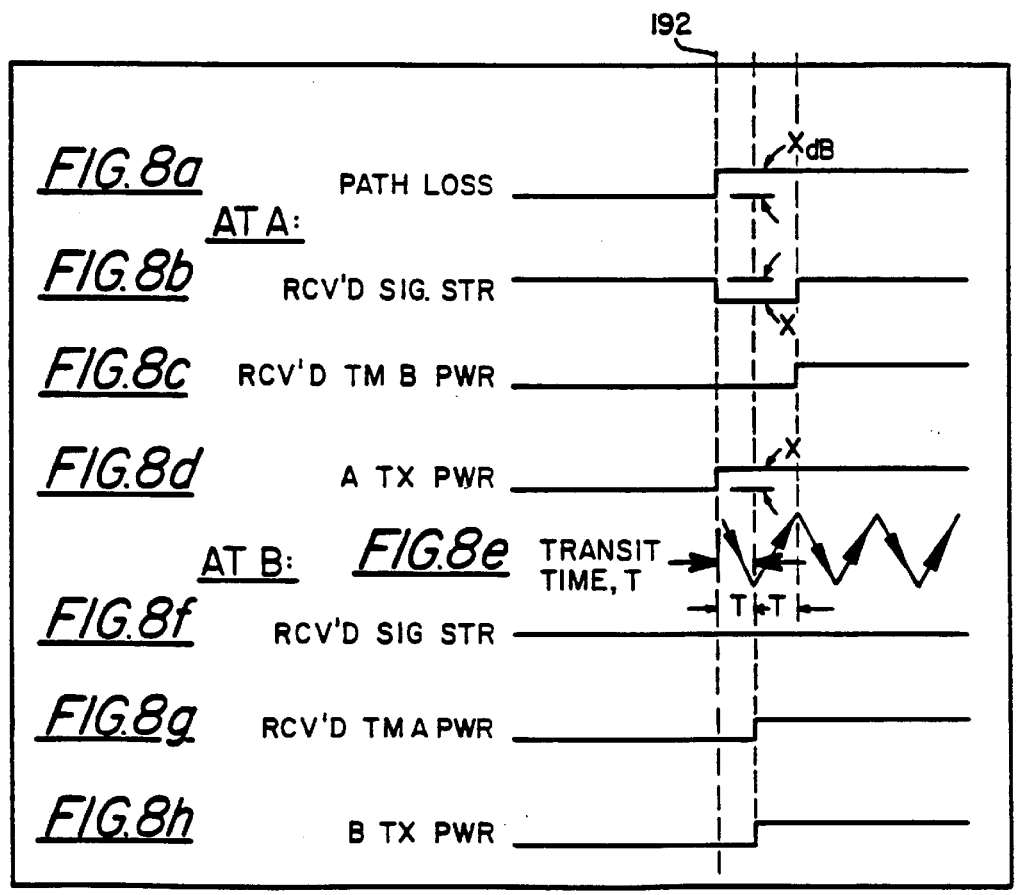
FIG. 8a PATH LOSS
AT A:
FIG. 8b RCV'D SIG. STR
FIG. 8c RCV'D TM B PWR
FIG. 8d A TX PWR
AT B: FIG. 8e TRANSIT TIME, T
FIG. 8f RCV'D SIG STR
FIG. 8g RCV'D TM A PWR
FIG. 8h B TX PWR

POSITION DETERMINATION FOR REDUCING UNAUTHORIZED USE OF A COMMUNICATION SYSTEM

RELATED APPLICATIONS

This application is a continuation of U.S. patent application Ser. No. 08/255,341, filed Jun. 7, 1994 now abandoned, which is, in-turn, a continuation-in-part of U.S. patent application Ser. No. 08/145,246, filed Oct. 28, 1993, now U.S. Pat. No. 5,446,756, which is, in-turn, a continuation-in-part of U.S. patent application Ser. No. 07/781,972, filed Oct. 24, 1991, now U.S. Pat. No. 5,339,330, derived from PCT Application PCT/US91/01852, filed Mar. 19, 1991, which was, in-turn, a continuation-in-part of U.S. patent application Ser. No. 07/495,497, filed Mar. 19, 1990, now U.S. Pat. No. 5,073,900.

BACKGROUND

This invention relates to improvements in mobile wireless communication systems.

In another respect the invention pertains to mobile wireless communications systems which can locate and/or disable the communications equipment of a fraudulent user of the system.

More particularly, the invention relates to communication systems such as a cellular mobile communications system having integrated satellite and ground nodes.

According to another aspect the invention concerns methods and apparatus for minimizing interference due to passive intermodulation (PIM) of radiated energy in a satellite using a single large antenna for communication to and from a user's transceiver.

In yet another respect the invention pertains to a multi-node wireless communications systems provided with methods and protocols for seamless hand-over of a user from one node to another.

The cellular communications industry has grown at a fast pace in the United States and even faster in some other countries. It has become an important service of substantial utility and because of the growth rate, saturation of the existing service is of concern. High density regions having high use rates, such as Los Angles, New York and Chicago are of most immediate concern. Contributing to this concern is the congestion of the electromagnetic frequency spectrum which is becoming increasingly severe as the communication needs of society expand. This congestion is caused not only by cellular communications systems but also by other communications systems. However, in the cellular communications industry alone, it is estimated that the number of mobile subscribers will increase on a world-wide level by an order of magnitude within the next ten years. The radio frequency spectrum is limited and in view of this increasing demand for its use, means to more efficiently use it are continually being explored.

Mobile communications system such as Specialized Mobile Radio (SMR), the planned Personal Communications Service (PCS) and existing cellular radio are primarily aimed at providing mobile telephone service to automotive users in developed metropolitan areas. For remote area users, airborne users, and marine users, AIRFONE and INMARSAT services exist but coverage is incomplete and/or service is relatively expensive. Mobile radio satellite systems in an advanced planning stage will probably provide improved direct-broadcast voice channels to mobile subscribers in remote areas but still at significantly higher cost in comparison to existing ground cellular service. The ground cellular and planned satellite technologies complement one another in geographical coverage in that the ground cellular communications service provides voice and data telephone service in relatively developed urban and suburban areas but not in sparsely populated areas, while the planned earth orbiting satellites will serve the sparsely populated areas. Although the two technologies use the same general area of the RF spectrum, they are basically separate and incompatible by design as they presently exist. At present, if a user needs both forms of mobile communications coverage, he must invest in two relatively expensive subscriber units, one for each system.

The demand for mobile telephone service is steadily expanding and with the expansion of the service, the problem of serving an increased number of subscribers who are travelling from one region to another has become of primary importance. Cellular communications systems divide the service areas into geographical cells, each served by a base station or node typically located at its center. The central node transmits sufficient power to cover its cell area with adequate field strength. If a mobile user moves to a new cell, the radio link is switched to the new node provided there is an available channel. However, if the mobile user travels into a region where all channels are busy, or that is not served by cellular service, or, in some cases, into an area served by a different licensee/provider, then his call may be abruptly terminated.

Present land mobile communication systems typically use a frequency modulation (FM) approach and because of the limited interference rejection capabilities of FM modulation, each radio channel may be used only once over a wide geographical area encompassing many cells. This means that each cell can use only a small fraction of the total allocated radio frequency band, resulting in an inefficient use of the available spectrum. In some cases, the quality of speech is poor because of the phenomena affecting FM transmission known as fading and "dead spots". The subjective effect of fading is repeated submersion of the voice signal in background noise frequently many times per second if the mobile unit is in motion. The problem is exacerbated by interference from co-channel users in distant cells and resultant crosstalk due to the limited interference rejection capability of FM. Additionally, communications privacy is relatively poor; the FM signal may be heard by others who are receiving that frequency.

In the case where one band of frequencies is preferable over others and that one band alone is to be used for mobile communications, efficient communications systems are necessary to assure that the number of users desiring to use the band can be accommodated. For example, there is presently widespread agreement on the choice of L-band as the technically preferred frequency band for the satellite-to-mobile link in mobile communications systems. In the case where this single band is chosen to contain all mobile communications users, improvements in spectral utilization in the area of interference protection and in the ability to function without imposing intolerable interference on other services will be of paramount importance in the considerations of optimal use of the scarce spectrum.

The spread spectrum communications technique is a technology that has found widespread use in military applications which must meet requirements for security, minimized likelihood of signal detection, and minimum susceptibility to external interference or jamming. In a spread spectrum system, the data modulated carrier signal is further modulated by a relatively wide-band, pseudo-random "spreading" signal so that the transmitted bandwidth is much greater than the bandwidth or rate of the information to be transmitted. Commonly the "spreading" signal is generated by a pseudo-random deterministic digital logic algorithm which is duplicated at the receiver.

By further modulating the received signal by the same spreading waveform, the received signal is remapped into the original information bandwidth to reproduce the desired signal. Because a receiver is responsive only to a signal that was spread using the same unique spreading code, a uniquely addressable channel is possible. Also, the power spectral density is low and without the unique spreading code, the signal is very difficult to detect, much less decode, so privacy is enhanced and interference with the signals of other services is reduced. The spread spectrum signal has strong immunity to multipath fading, interference from other users of the same system, and interference from other systems.

In a satellite communications system, downlink power is an important consideration. Satellite power is severely limited; therefore, the number of users of the satellite that can be accommodated, and consequently the economic viability of such a system, is in inverse proportion to how much satellite transmitter power must be allocated to each user. Many of the proposed mobile communications satellite systems have relied upon user antenna directivity to provide additional effective power gain. This has resulted in significant user equipment expense and the operational inconvenience of having to perform some steering or selection of the antenna to point at the satellite. Additionally, hand held transceivers are impractical because of the relatively large directive antennas required.

In some ground cellular service, the user transceiver commonly radiates at a power level which is 30 to 40 dB greater than is required on the average in order to overcome fading nulls. This results in greatly increased intersystem interference and reduced battery life. It would also be desirable to provide a power control system to compensate for fading and interference without exceeding the minimum amount of power necessary to overcome such interference.

Additionally, a user position determination capability would be useful for certain applications of a cellular communications system such as tracking the progress of commercial vehicles en route. A further use may be to provide users with an indication of their own position. Such a capability would be more useful with increased accuracy.

Thus it would be desirable to provide a cellular communications system which integrates satellite nodes with surface nodes to provide coverage of greater surface areas without requiring the use of two different systems with attendant expense and hardware requirements. Additionally, it would be desirable to provide a cellular communications system using a spread spectrum technique which can make more efficient use of existing frequency spectrum resources and result in increased privacy in communications. Additionally, it would be desirable to permit the use of a relatively low power, compact and mobile user handset having a small, non-directional antenna, one which can communicate with both the land-based stations and the satellite-based stations.

Additionally, it would be desirable to reduce or eliminate fraudulent use of a wireless system by improved detection and location of the fraudulent user.

Additionally, it would be desirable to minimize interference due to Passive Inter Modulation of radiated energy in a satellite using a single large antenna for communication to and from the user's handset.

It would additionally be desirable to develop a protocol for seamless hand over of a user from one system node to another.

SUMMARY OF THE INVENTION

The invention provides improvements in wireless communications systems. While various aspects of the invention will be explained by reference, for example, to a cellular communications system using spread spectrum waveforms, it will be apparent to those skilled in the art that these techniques are applicable to similar forms of wireless communications systems, such as, for example, Specialized Mobile Radio (SMR), the planned Personal Communications Service (PCS) and existing cellular radio systems.

The invention provides improvements in such wireless communications systems, for example, a cellular communications system using spread spectrum waveforms. The spread spectrum system makes possible the use of very low rate, highly redundant coding without loss of capacity to accommodate a large number of users within the allocated bandwidth.

Briefly, in one aspect, the invention is directed to a wireless communications system which includes node means and a plurality of user units, each said user unit including a means for establishing selective communication between the node and the user unit. Such a system is improved by establishing the geographical location of the selected user with the known locations of authorized users and denying service to the selected user if the selected users location does not correspond to one of the known locations of authorized users. Preferably, the system includes means for determining the position of a selected user unit by providing a timing signal to the selected user unit from the node, providing a timing response signal from the selected user unit from the node, providing a time response signal from the selected user unit in response to each timing signal, receiving the timing response signal by the node, measuring the response time of the user unit to the timing signal based on receipt of the timing response signal, and determining the position of the user unit based on the round trip time of transmission of the timing signal and receipt of the timing response signal.

In a more detailed aspect of the invention, the position means comprises means for measuring the response times of the user unit to respective timing signals transmitted by at least two nodes and for determining the position of the selected user unit based on the round trip times from each timing signal transmitting surface node.

In yet another aspect, the position means comprises means for determining the position of the selected user unit by measuring at a plurality of nodes the response time of the user unit to a timing signal transmitted by at least one of the nodes and determining the position of the selected user unit based on the times of receipt by the nodes of the timing response signal from the user unit.

In another aspect, the position means may store a priori information about the selected user unit and may determine the position of the selected user unit by providing a timing signal to the user unit from a node, measuring the response time of the user unit to the timing signal at the node, and determining the position of the user unit based on such measurement and on the a priori information. Additionally, the position means also determines in which cell a selected user unit is and indicates the location of the cell.

In yet another aspect of the invention, an adaptive transmitter power control system and method compensate for received signal strength variations, such as those caused by building, foliage and other obstructions. A path loss measure is derived from the received signal strength and from data included in each transmitted signal which indicates that transmitter's output power level. Based on the derived path loss and the transmitter's power level data, the receiver can then adjust the power output of its own associated transmitter accordingly.

In yet a further aspect, each receiver determines the quality of the received signal and provides a local quality signal to its associated transmitter in the respective transceiver indicative of that received signal quality. Each transmitter also transmits the local quality signal provided to it from its associated receiver and the transceiver is additionally responsive to the quality signal received from the other transceiver with which it is in communication to control its own output power in the response to that quality signal.

In a more detailed aspect, the error rate of the received signal is determined in providing the quality signal, and in another aspect, the signal-to-noise ratio (SNR) is measured to determine quality. The transceiver receiving the error rate signal or the SNR from the other transceiver controls its own transmitter power output in response.

According to still another aspect of the invention, seamless hand-over of a mobile user from one system node to another is provided. Briefly, according to this aspect of the invention, in the operation of a wireless communications system, which system includes a plurality of nodes, a plurality of user units and means for establishing selective communication between said first one of said nodes to a second one of said nodes, the improvement comprising establishing an algorithm for determining a preferred node for said selective communication at any selected time, periodically recomputing said algorithm, establishing communication between said first node and said second node when said algorithm computation indicates that said second node is the preferred node, establishing call-initiation handshaking between said user and said second node, while maintaining said selective communication with said first node, establishing communications lock between said user and said second node, and interrupting communication between said user and said first node when said lock is established.

According to still another aspect of the invention, in the operation of a satellite communications system, which includes at least two satellite nodes for separately receiving and transmitting signals to and from user units, the improvement is provided for eliminating passive intermodulation interference of the transmitted and received signals, comprising transmitting all node-transmitted signals from the antenna of a first one of said satellite nodes and receiving all of said node-received signals by a second one of said satellite nodes. In another embodiment, the passive intermodulation interference is eliminated by time-duplexing the signals transmitted to and received from each satellite's antenna. In yet another embodiment, passive intermodulation interference is reduced by assigning unique transmit and receive subbands to each of the satellites.

Other aspects and advantages of the invention will become apparent from the following detailed description and the accompanying drawings, illustrating by way of example the features of the invention.

BRIEF DESCRIPTION OF THE DRAWINGS

FIG. 6 is a block diagram of one embodiment of a satellite signal processing in the system in FIG. 5;

FIGS. 8(a) through 8(h) show timing diagrams of an adaptive, two-way power control system.

DETAILED DESCRIPTION OF THE PREFERRED EMBODIMENTS

As is shown in the exemplary drawings, the invention is embodied in a mobile system, e.g., a cellular communications system utilizing integrated satellite and ground nodes both of which use the same modulation, coding, and spreading structure and both responding to an identical user unit.

Figure 1A:
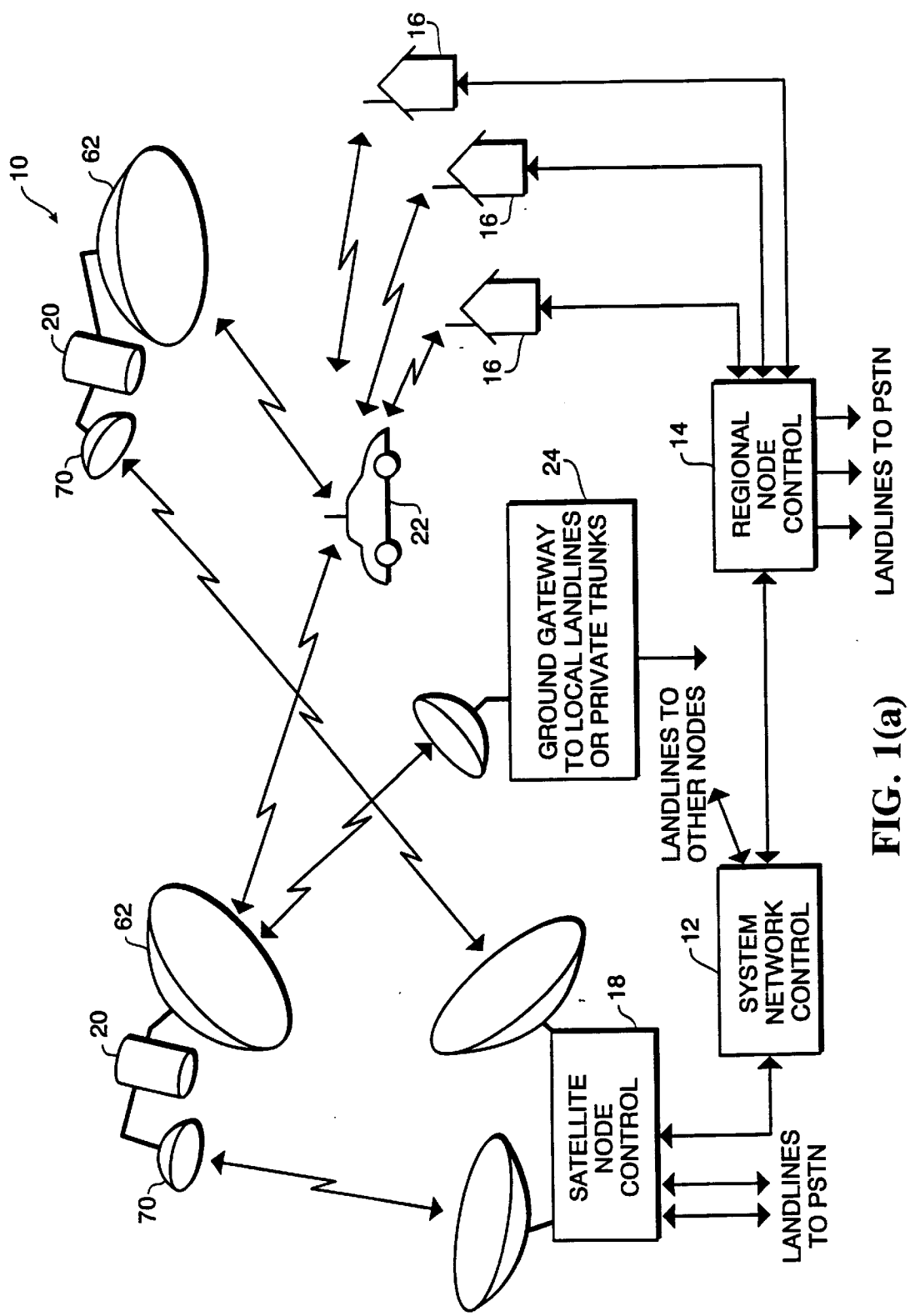
FIGS. 1(a)–(c) are diagrams showing an overview of the principal elements of typical communications systems which embody the principles of the invention.

Referring now to FIG. 1(a), an overview of a communications system 10 is presented showing the functional interrelationships of the major elements. The system network control center 12 directs the top level allocation of calls to satellite and ground regional resources throughout the system. It also is used to coordinate system-wide operations, to keep track of user locations, to perform optimum allocation of system resources to each call, dispatch facility command codes, and monitor and supervise overall system health. The regional node control centers 14, one of which is shown, are connected to the system network control center 12 and direct the allocation of calls to ground nodes within a major metropolitan region. The regional node control center 14 provides access to and from fixed land communication lines, such as commercial telephone systems known as the public switched telephone network (PSTN). The ground nodes 16 under direction of the respective regional node control center 14 receive calls over the fixed land line network, encode them, spread them according to the unique spreading code assigned to each designated user, combine them into a composite signal, modulate that composite signal onto the transmission carrier, and broadcast them over the cellular region covered.

Satellite node control centers 18 are also connected to the system network control center 12 via status and control land lines and similarly handle calls designated for satellite links such as from PSTN, encode them, spread them according to the unique spreading codes assigned to the designated users, and multiplex them with other similarly directed calls into an uplink trunk, which is beamed up to the designated satellite 20. Satellite nodes 20 receive the uplink trunks, frequency demultiplex the calls intended for different satellite cells, frequency translate and direct each to its appropriate cell transmitter and cell beam, and broadcast the composite of all such similarly directed calls down to the intended satellite cellular area. As used herein, "backhaul" means the link between a satellite 20 and a satellite node control center 18. In one embodiment, it is a K-band frequency while the link between the satellite 20 and the user unit 22 uses an L-band or an S-band frequency.

As used herein, a "node" is a communication site or a communication relay site capable of direct one or two-way radio communication with users. Nodes may include moving or stationary surface sites or airborne or satellite sites.

User units 22 respond to signals of either satellite or ground node origin, receive the outbound composite signal, separate out the signal intended for that user by despreading using the user's assigned unique spreading code, de-modulate, and decode the information and deliver the call to the user. Such user units 22 may be mobile or may be fixed in position. Gateways 24 provide direct trunks that is, groups of channels, between satellite and the ground public switched telephone system or private trunk users. For example, a gateway may comprise a dedicated satellite terminal for use by a large company or other entity. In the embodiment of FIG. 1, the gateway 24 is also connected to that system network controller 12.

All of the above-discussed centers, nodes, units and gateways are full duplex transmit/receive performing the corresponding inbound (user to system) link functions as well in the inverse manner to the outbound (system to user) link functions just described.

Figure 1B:
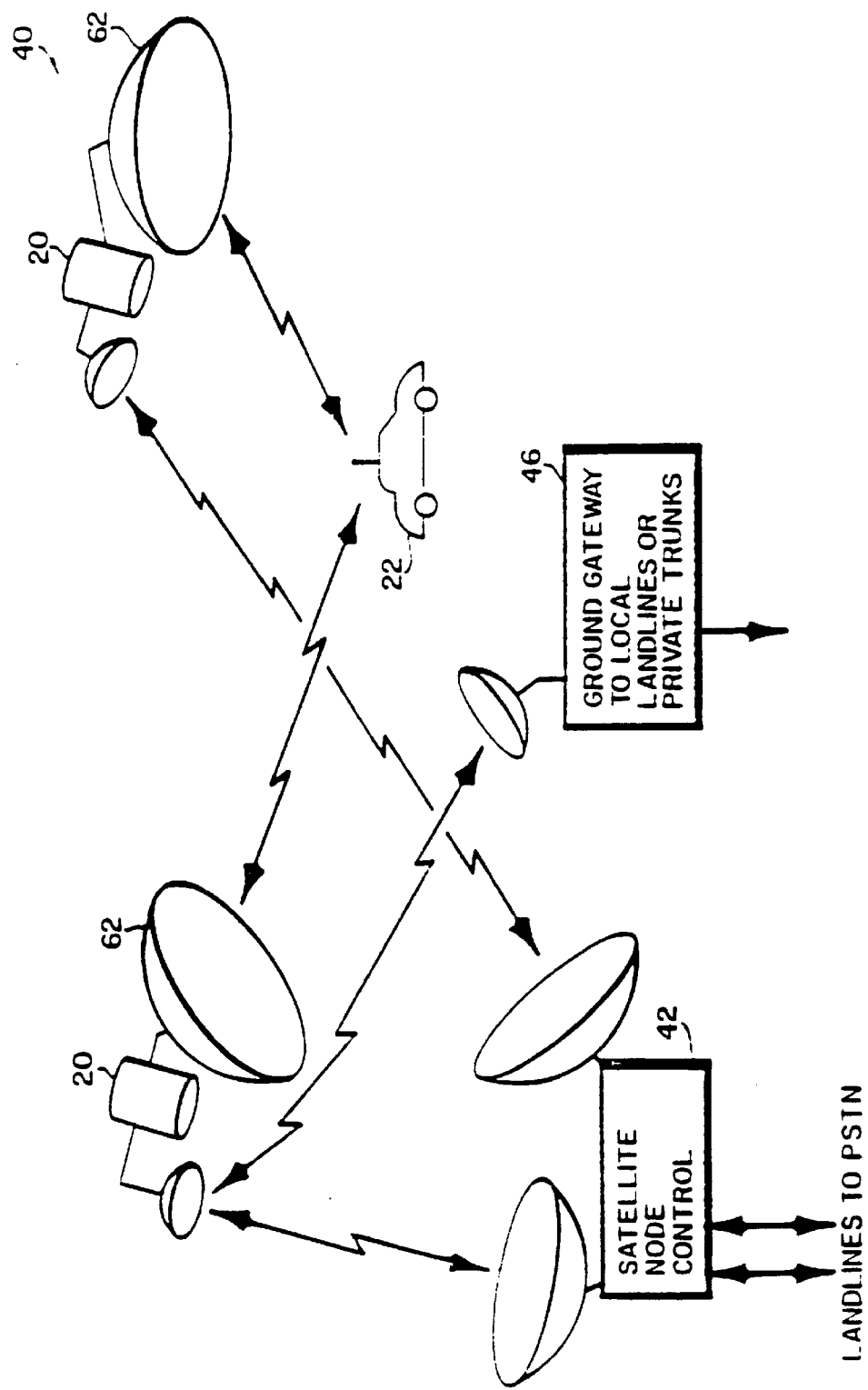
Figure 1C:
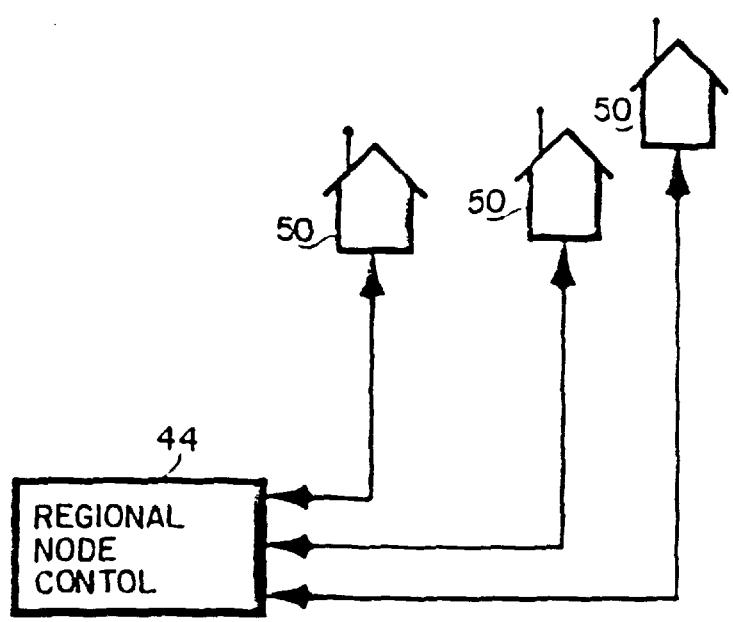

FIGS. 1(b) and 1(c) represent systems with space only and ground only nodes. Certain aspects of this invention relate to these two systems as well as the "hybrid" system previously described.

Figure 2:
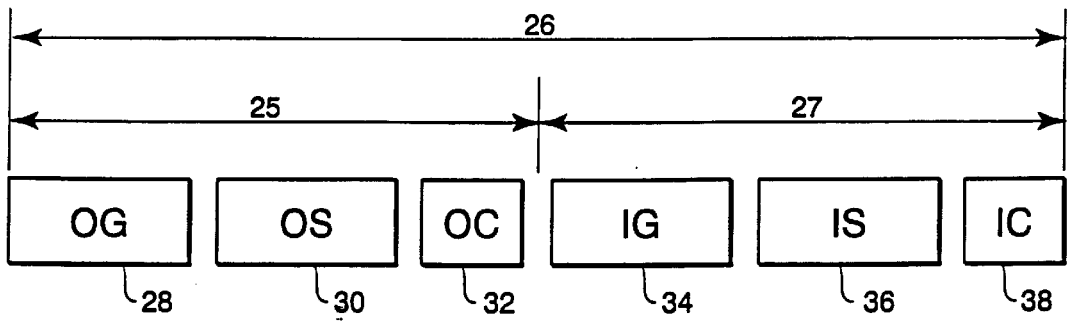
FIG. 2 is a diagram of the frequency sub-bands of the frequency band allocation for a mobile system, e.g., a cellular system.

Referring now to FIG. 2, the allocated frequency band 26 of a communications system is shown. The allocated frequency band 26 is divided into 2 main sub-bands, an outgoing sub-band 25 and an incoming sub-band 27. Additionally the main sub-bands are themselves divided into further sub-bands which are designated as follows:

OG: Outbound Ground 28 (ground node to user)
OS: Outbound Satellite 30 (satellite node to user)
OC: Outbound Calling and Command 32 (node to user)
IG: Inbound Ground 34 (user to ground node)
IS: Inbound Satellite 36 (user to satellite node)
IC: Inbound Calling and Tracking 38 (user to node)

All users in all cells user the entire designated sub-band for the described function. Unlike existing ground or satellite mobile systems, there is no necessity for frequency division by cells; all cells may use these same basic six sub-bands. This arrangement results in a higher frequency reuse factor as is discussed in more detail below.

In one aspect of the invention, the satellite 20 both receives signals (IS) and transmits (OS) signals to the user through a single large antenna 62. If the transmit and receive frequencies are sufficiently far apart, Passive Inter Modulation (PIM) of the transmit signals will not cause perceptible distortion of the received signals. If, however, the transmit and receive frequencies which are assigned are too close together, PIM of the transmit signals may cause distortion and/or loss of capacity or even render unintelligible the signals received by the satellite. In such cases, the solution in the past has been to use two antennas on the satellite, one for transmission and one for reception of the signals. In the case of a very large spacecraft antenna, which permits very high capacity and very low user power, it may not be practical to provide a two-antenna satellite.

Figure 13:
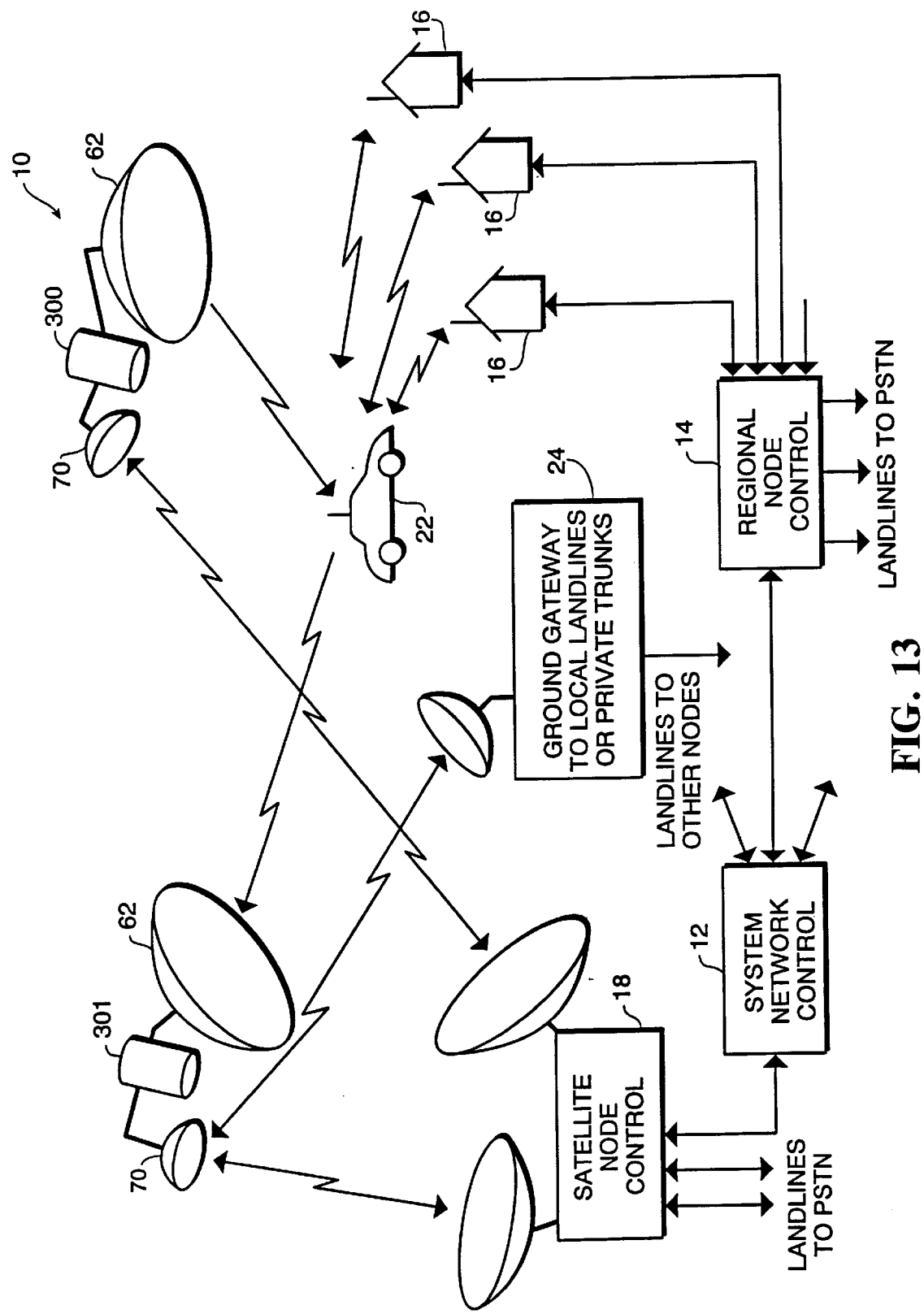
FIG. 13 is a block diagram showing an overview of the principal elements of a communications system in accordance with the principles of the invention wherein one satellite is used to transmit and a second satellite is used to receive the signals from the mobile user.

FIG. 13 shows an embodiment of the invention which completely eliminates the PIM interference problem. One satellite 300 is used to transmit to the mobile user and a second satellite 301 is used to receive the signals from the mobile user. Such satellites could be paired together at one orbital location, or they could be separated, but both must be within the field of view of the user. If specific system design considerations indicate that a third satellite should also be used, then two satellites could be used to transmit, and one could be used to receive (or vice versa), again resulting in no problems with PIM products. This aspect of the invention can be extended to any practical number of satellites.

Figure 14:
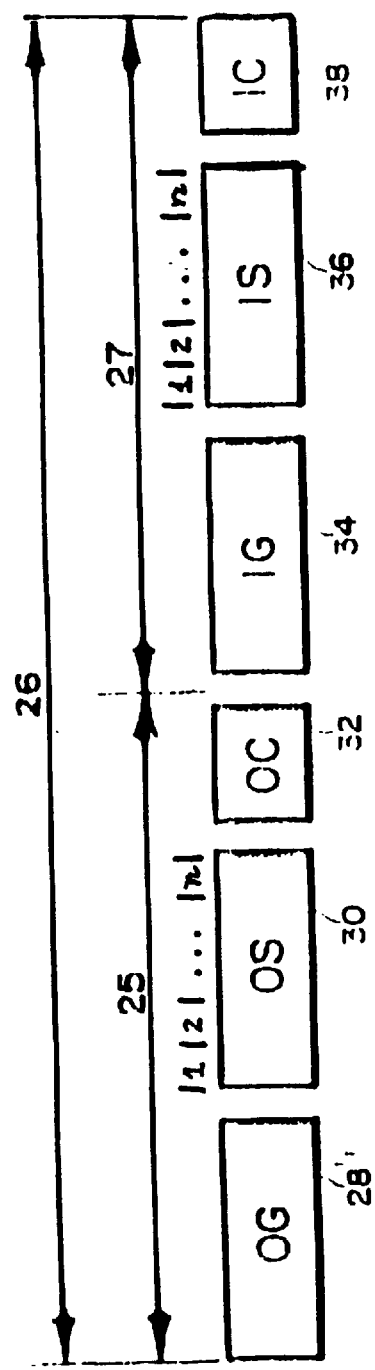
FIG. 14 is a diagram of the frequency sub-bands of the frequency band allocation as modified in one embodiment to minimize the PIM with a multiple satellite system.

Yet another aspect of the invention, which reduces but does not completely eliminate PIM effects with a frequency duplexed system, is a multiple satellite system in which non overlapping portions of the signal bands are allocated to the different satellites, as shown in FIG. 14. The lowest order of intermodulation (IM) product is given by:

$$\text{Lowest order}=\text{integer}(|Ftx-Frx|)*2/\text{Band Width}+1$$

If more than one (n>1) satellite is to be launched, a unique portion (most likely 1/n) of the satellite sub-bands OS and IS is assigned to each of the n satellites. This increases the lowest order of the intermodulation product by a factor of n, and hence greatly reduces the magnitude of the intermodulation power fed into the satellite receiver.

For example, one frequency band under consideration for mobile satellite services is 1970–1990 MHz (satellite receive, Frx) and 2160–2180 MHz (satellite transmit, Ftx). In this case the lowest order IM product is equal to 20, which would be considered too low for the design of this satellite service. In the case where a three satellite system is used, if, instead of assigning the entire band to all three satellites, one third of the band is assigned to each of the three satellites, the lowest IM product is 58, which would be acceptable.

The duplexing technique discussed throughout this application is, obviously, frequency duplexing wherein signals from the user are in a different band from the signals to the user. This is the situation shown in FIG. 2. An alternate duplexing method which will completely eliminate any PIM problem is to use time duplexing of the signals to and from the satellite instead of frequency duplexing the signals. PIM is eliminated since the satellite transmits and receives at different times. When time duplexing at the satellite is used to resolve a potential satellite IM problem, the user's unit can be either time duplexed or frequency duplexed. In both cases, the satellite transmit and receive signals must not overlap in time.

Figure 10:
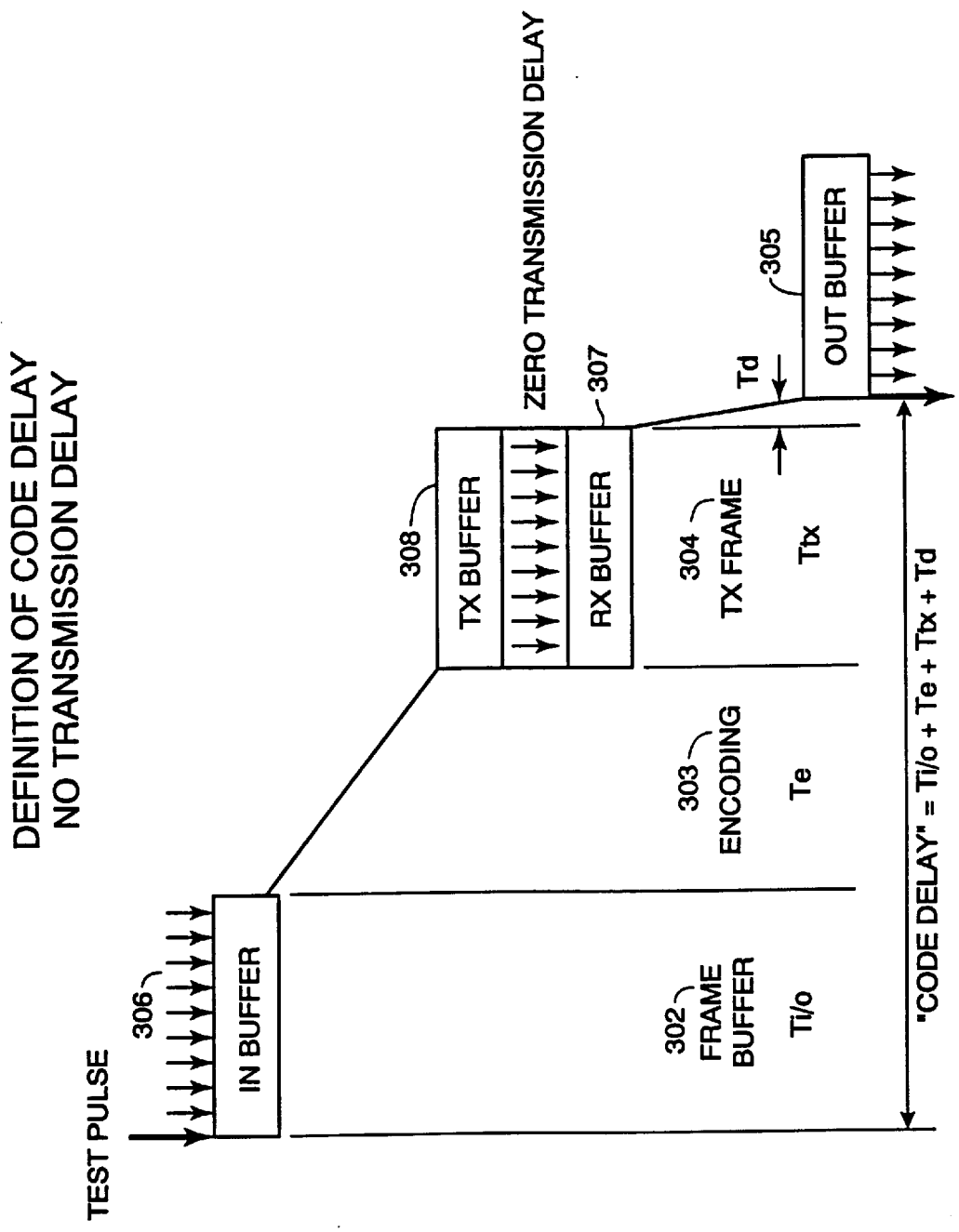
FIG. 10 explains the term Code Delay.

In this invention, since the user's position and the satellite position are known the distance from the user to the satellite is computed and hence the transit time for signals can be computed. The user unit's transmissions are then timed to arrive at the satellite within designated receive time slots, with no loss of communications capacity. The satellite power is doubled, but it transmits only half the time. FIG. 10 shows that the signal is buffered 306 into a frame which has a fixed number of bits for transmission and requires a time $T_{i/o}$ 302. The signal is encoded with a time frame of $t_e$. Buffering in the transmit buffer requires a time $T_{tx}$. FIG. 10 depicts a system with a zero transmission time delay. There is, then, a final time delay $T_d$ before the signal fills the out buffer 307.

Figure 11:
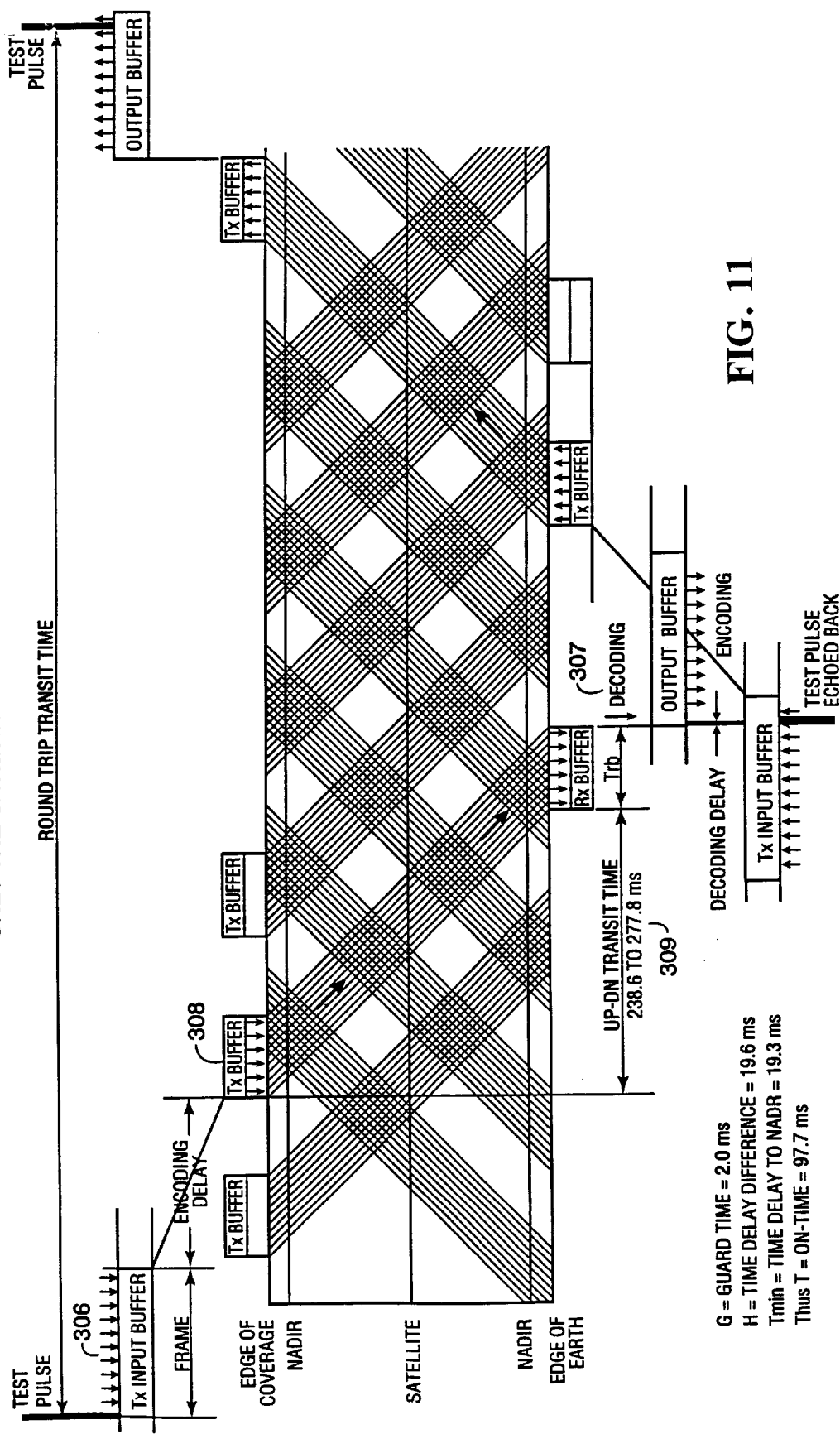
FIG. 11 depicts transmit and receive time slots when the satellite is time duplexed and the user is frequency duplexed.

With a geosynchronous satellite FIG. 11 there is a round trip transit time of from 238.6 to 277.8 ms. In this aspect of this invention the satellite is time duplexed and the user unit is frequency duplexed. It can be seen that the satellite can transmit and receive on a 50% duty cycle.

Figure 12:
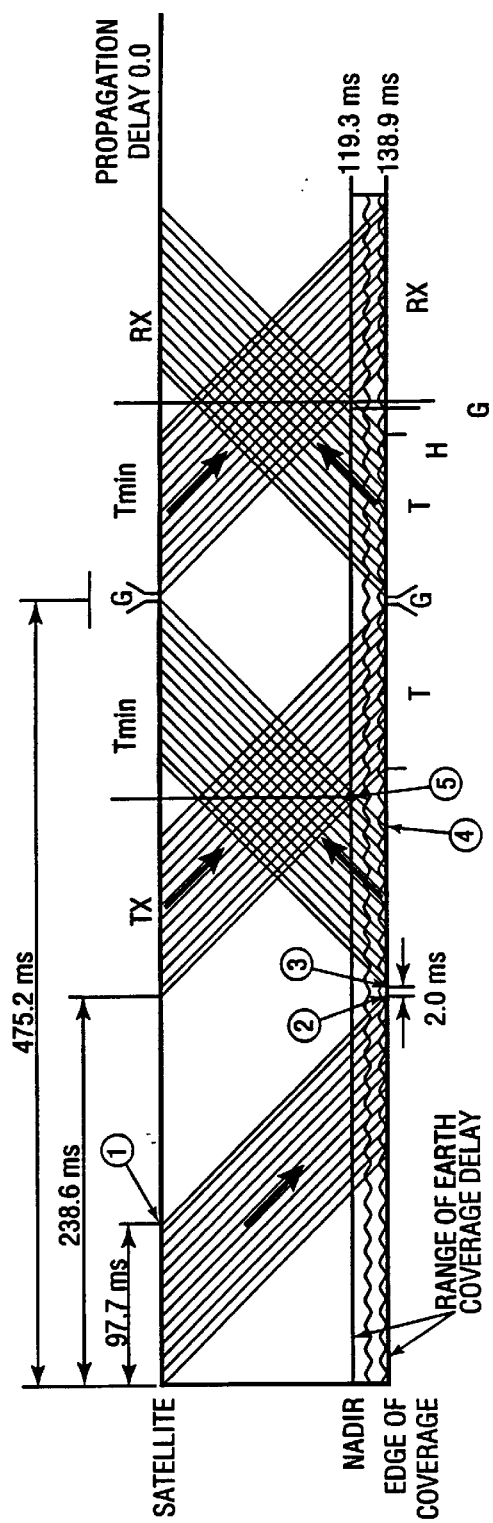
FIG. 12 depicts transmit and receive time slots when the satellite and the user unit are both time duplexed.

In yet another aspect of the invention, both the satellite and the user units can be timed duplexed FIG. 12. In this case, guard bands must be provided to make certain that transmit and receive signals do not overlap at either the satellite or the user unit. The example shown relates to a geosynchronous satellite. In this aspect of this invention, the satellite can transmit on a 41% duty cycle.

In one embodiment, a mobile user's unit 22 will send an occasional burst of an identification signal in the IC sub-band either in response to a poll or autonomously. This may occur when the unit 22 is in standby mode. This identification signal is tracked by the regional node control center 14 as long as the unit is within that respective region, otherwise the signal will be tracked by the satellite node or nodes. In another embodiment, this identification signal is tracked by all ground and satellite nodes capable of receiving it. This information is forwarded to the network control center 12 via status and command lines. By this means, the applicable regional node control center 14 and the system network control center 12 remain constantly aware of the cellular location and link options for each active user 22. An intra-regional call to or from a mobile user 22 will generally be handled solely by the respective regional node control center 14. Inter-regional calls are assigned to satellite or ground regional system resources by the system network control center 12 based on the location of the parties to the call, signal quality on the various link options, resource availability and best utilization of resources.

A user 22 in standby mode constantly monitors the common outbound calling frequency sub-band OC 32 for calling signals addressed to him by means of his unique spreading code. Such calls may be originated from either ground or satellite nodes. Recognition of his unique call code initiates the user unit 22 ring function. When the user goes "off-hook", e.g., by lifting the handset from its cradle, a return signal is broadcast from the user unit 22 to any receiving node in the user calling frequency sub-band IC 38. This initiates a handshaking sequence between the calling node and the user unit which instructs the user unit whether to transition to either satellite, or ground frequency sub-bands, OS 30 and IS 36 or OG 28 and IG 34.

A mobile user wishing to place a call simply takes his unit 22 off hook and dials the number of the desired party, confirms the number and "sends" the call. Thereby an incoming call sequence is initiated in the IC sub-band 38. This call is generally heard by several ground and satellite nodes which forward call and signal quality reports to the appropriate system network control center 12 which in turn designates the call handling to a particular satellite node 20 or regional node control center 14. The call handling element then initiates a handshaking function with the calling unit over the OC 32 and IC 38 sub-bands, leading finally to transition to the appropriate satellite or ground sub-bands for communication.

Figure 3:
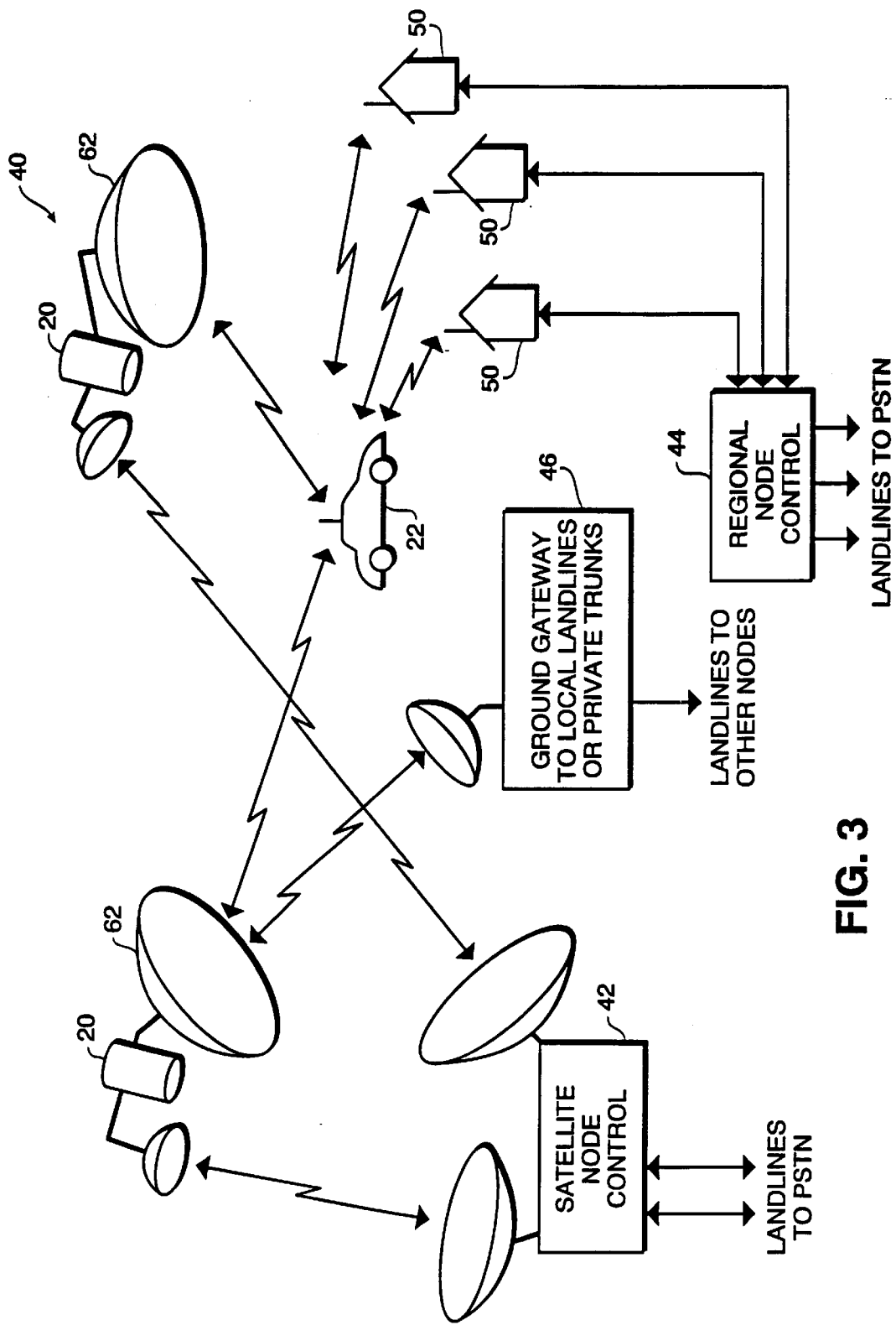
FIG. 3 is an overview block diagram of a communications system in accordance with the principles of the invention without a network control center.

Referring now to FIG. 3, a block diagram of a communications system 40 which does not include a system network control center is presented. In this system, the satellite node control centers 42 are connected directly into the land line network as are also the regional node control centers 44. Gateway systems 46 are also available as in the system of FIG. 1, and connect the satellite communications to the appropriate land line or other communications systems. The user unit 22 designates satellite node 48 communication or ground node 50 communication by sending a predetermined code. Alternatively, the user unit could first search for one type of link (either ground or satellite) and, if that link is present, use it. If that link is not present, use the alternate type of link.

Figure 4:
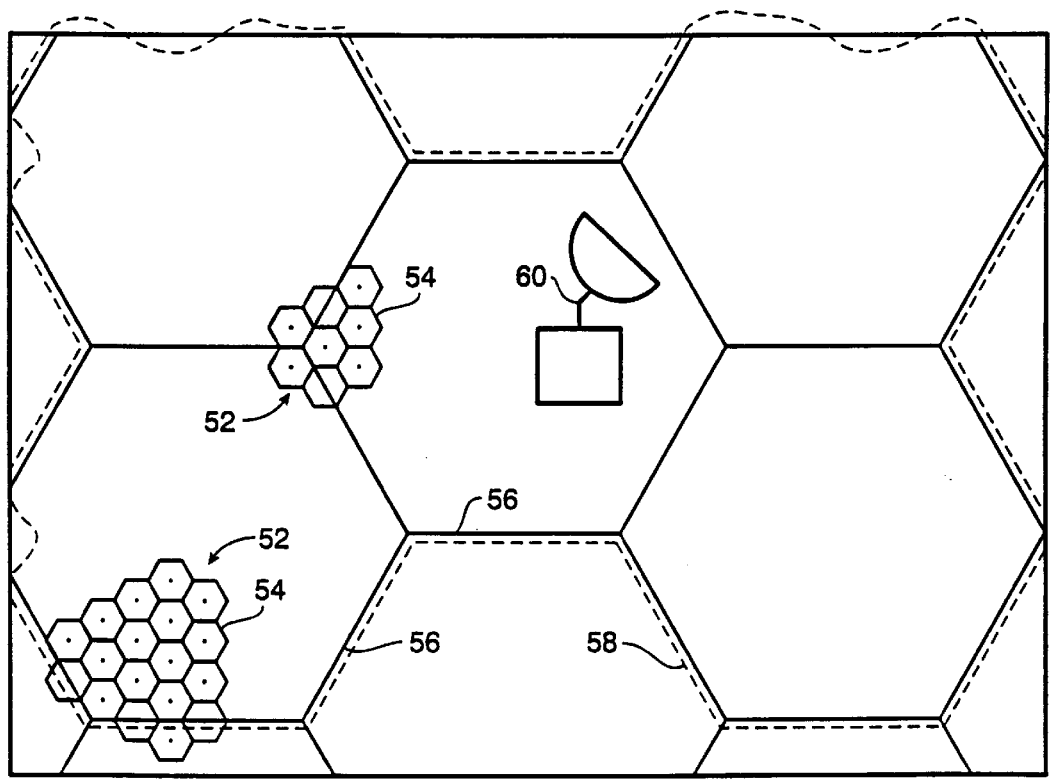
FIG. 4 is a diagram showing the interrelationship of the cellular hierarchial structure of the ground and satellite nodes in a typical section and presents a cluster comprising more than one satellite cell.

Referring now to FIG. 4, a hierarchial cellular structure is shown. A pair of clusters 52 of ground cells 54 are shown. Additionally, a plurality of satellite cells 56 are shown. Although numerals 54 and 56 point only to two cells each, this has been done to retain clarity in the drawing. Numeral 54 is meant to indicate all ground cells in the figure and similarly numeral 56 is meant to indicate all satellite cells. The cells are shown as hexagonal in shape, however, this is exemplary only. The ground cells may be from 3 to 15 km across although other sizes are possible depending on user density in the cell. The satellite cells may be approximately 200–500 km across as an example depending on the number of beams used to cover a given area. As shown, some satellite cells may include no ground cells. Such cells may cover undeveloped areas for which ground nodes are not practical. Part of a satellite cluster 58 is also shown. The cell members of such a cluster share a common satellite node control center 60.

A significant advantage of the invention is that by the use of spread spectrum multiple access, adjacent cells are not required to use different frequency bands. All ground-user links utilize the same two frequency sub-bands (OG 28, IG 34) and all satellite-user links use the same two frequency sub-bands (OS 30, IS 36). This obviates an otherwise complex and restrictive frequency coordination problem of ensuring that frequencies are not reused within cells closer than some minimum distance to one another (as in the FM approach), and yet provides for a hierarchial set of cell sizes to accommodate areas of significantly different subscriber densities.

Referring again to FIG. 1 as well as to FIG. 4, the satellite nodes 20 make use of large, multiple-feed antennas 62 which in one embodiment provide separate, relatively narrow beamwidth beams and associated separate transmitters for each satellite cell 56. For example, the multiple feed antenna 62 may cover an area such as the United States with, typically, about 100 satellite beams/cells and in one embodiment, with about 200 beams/cells. As used herein, "relatively narrow beamwidth" refers to a beamwidth that results in a cell of 500 km or less across. The combined satellite/ground nodes system provides a hierarchical geographical cellular structure. Thus within a dense metropolitan area, each satellite cell 56 may further contain as many as 100 or more ground cells 54, which ground cells would normally carry the bulk of the traffic originated therein. The number of users of the ground nodes 16 is anticipated to exceed the number of users of the satellite nodes 20 where ground cells exist within satellite cells. Because all of these ground node users would otherwise interfere as background noise with the intended user-satellite links, in one embodiment the frequency band allocation may be separated into separate segments for the ground element and the space element as has been discussed in connection with FIG. 2. This combined, hybrid service can be provided in a manner that is smoothly transparent to the user. Calls will be allocated among all available ground and satellite resources in the most efficient manner by the system network control center 12.

An important parameter in most considerations of cellular radio communications systems is the "cluster", defined as the minimal set of cells such that mutual interference between cells reusing a given frequency sub-band is tolerable provided that such "co-channel cells" are in different clusters. Conversely all cells within a cluster must use different frequency sub-bands. The number of cells in such a cluster is called the "cluster size". It will be seen that the "frequency reuse factor", i.e., the number of possible reuses of a frequency sub-band within the system is thus equal to the number of cells in the system divided by the cluster size. The total number of channels that can be supported per cell, and therefore overall bandwidth efficiency of the system is thus inversely proportional to the cluster size. By means to be described, the invention system achieves a minimum possible cluster size of one as compared to typically 7 to 13 for other ground or satellite cellular concepts and thereby a maximum possible frequency reuse factor. This is a major advantage of the invention.

Figure 5:
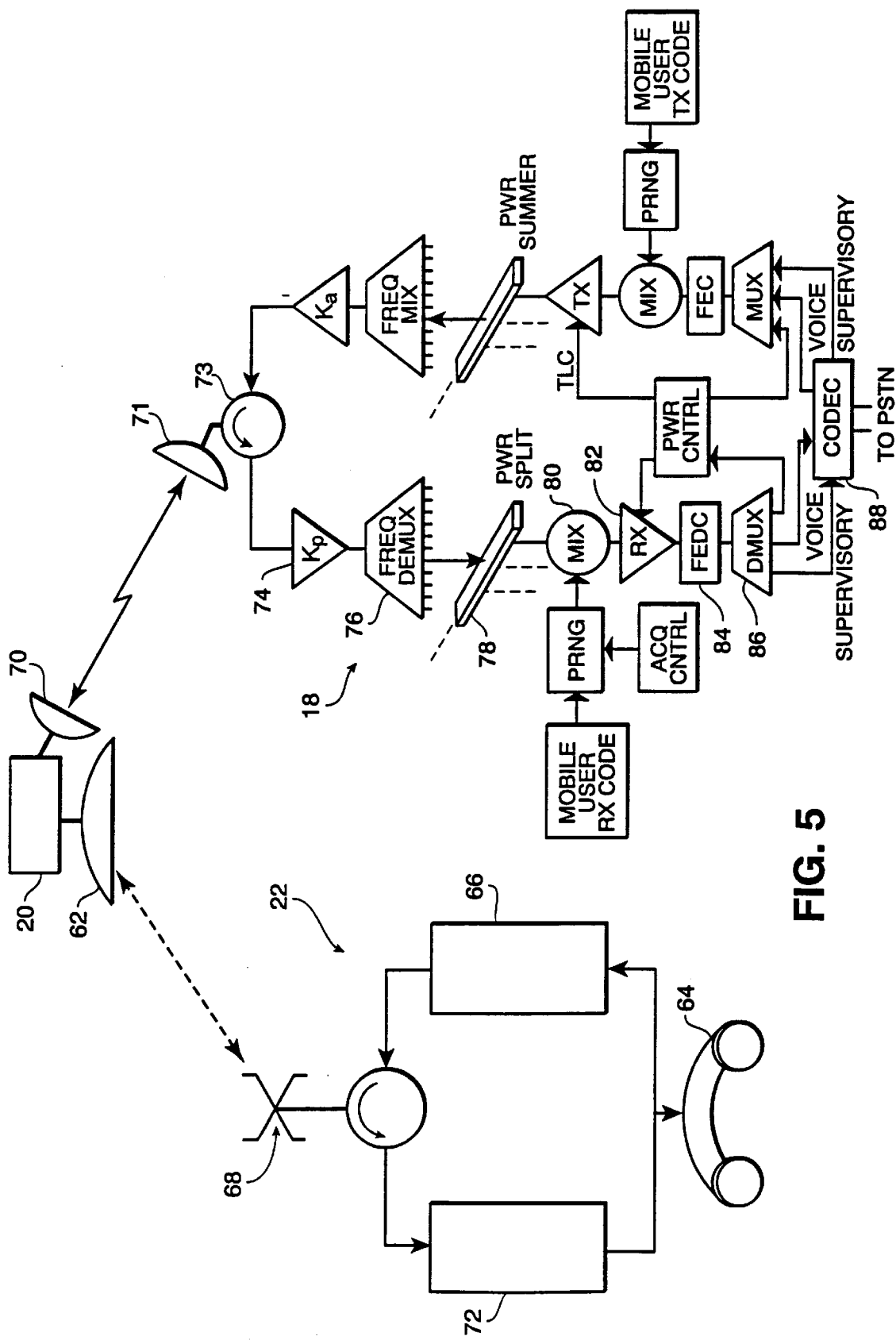
FIG. 5 is a block diagram of a satellite link system showing the user unit and satellite node control center.

Referring now to FIG. 5, a block diagram is shown of a typical user unit 22 to satellite 20 to satellite node control 18 communication and the processing involved in the user unit 22 and the satellite node control 18. In placing a call for example, the handset 64 is lifted and the telephone number entered by the user. After confirming a display of the number dialed, the user pushes a "send" button, thus initiating a call request signal. This signal is processed through the transmitter processing circuitry 66 which includes spreading the signal using a calling spread code. The signal is radiated by the omni-directional antenna 68 and received by the satellite 20 through its narrow beamwidth antenna 62. The satellite processes the received signal as will be described below and sends the backhaul to the satellite node control center 18 by way of its backhaul antenna 70. On receive, the antenna 68 of the user unit 22 receives the signal and the receiver processor 72 processes the signal. Processing by the user unit 22 will be described in more detail below in reference to FIG. 7.

The satellite node control center 18 receives the signal at its antenna 71, applies it to a circulator 73, amplifies 74, frequency demultiplexes 76 the signal separating off the composite signal which includes the signal from the user shown in FIG. 5, splits it 78 off to one of a bank of code correlators, each of which comprises a mixer 80 for removing the spreading and identification codes, an AGC amplifier 82, the FECC demodulator 84, a demultiplexer 86 and finally a voice encoder/decoder (CODEC) 88 for converting digital voice information into an analog voice signal. The voice signal is then routed to the appropriate land line, such as a commercial telephone system. Transmission by the satellite node control center 18 is essentially the reverse of the above described reception operation.

Referring now to FIG. 6, the satellite transponder 90 of FIG. 5 is shown in block diagram form. A circulator/diplexer 92 receives the uplink signal and applies it to an L-band or S-band amplifier 94 as appropriate. The signals from the M satellite cells within a "cluster" are frequency multiplexed 96 into a single composite K-band backhaul signal occupying M times the bandwidth of an individual L/S-band mobile link channel. The composite signal is then split 98 into N parts, separately amplified 100, and beamed through a second circulator 102 to N separate satellite ground cells. This general configuration supports a number of particular configurations various of which may be best adapted to one or another situation depending on system optimization which for example may include considerations related to regional land line long distance rate structure, frequency allocation and subscriber population. Thus, for a low density rural area, one may utilize an M-to-1 (M>1, N=1) cluster configuration of M contiguous cells served by a single common satellite ground node with M limited by available bandwidth. In order to provide high-value, long distance service between metropolitan area, already or best covered for local calling by ground cellular technology, an M-to-M configuration would provide an "inter-metropolitan bus" which would tie together all occupants of such M satellite cells as if in a single local calling region. To illustrate, the same cells (for example, Seattle, Los Angeles, Omaha and others) comprising the cluster of M user cells on the left side of FIG. 6, are each served by corresponding backhaul beams on the right side of FIG. 6.

Figure 7:
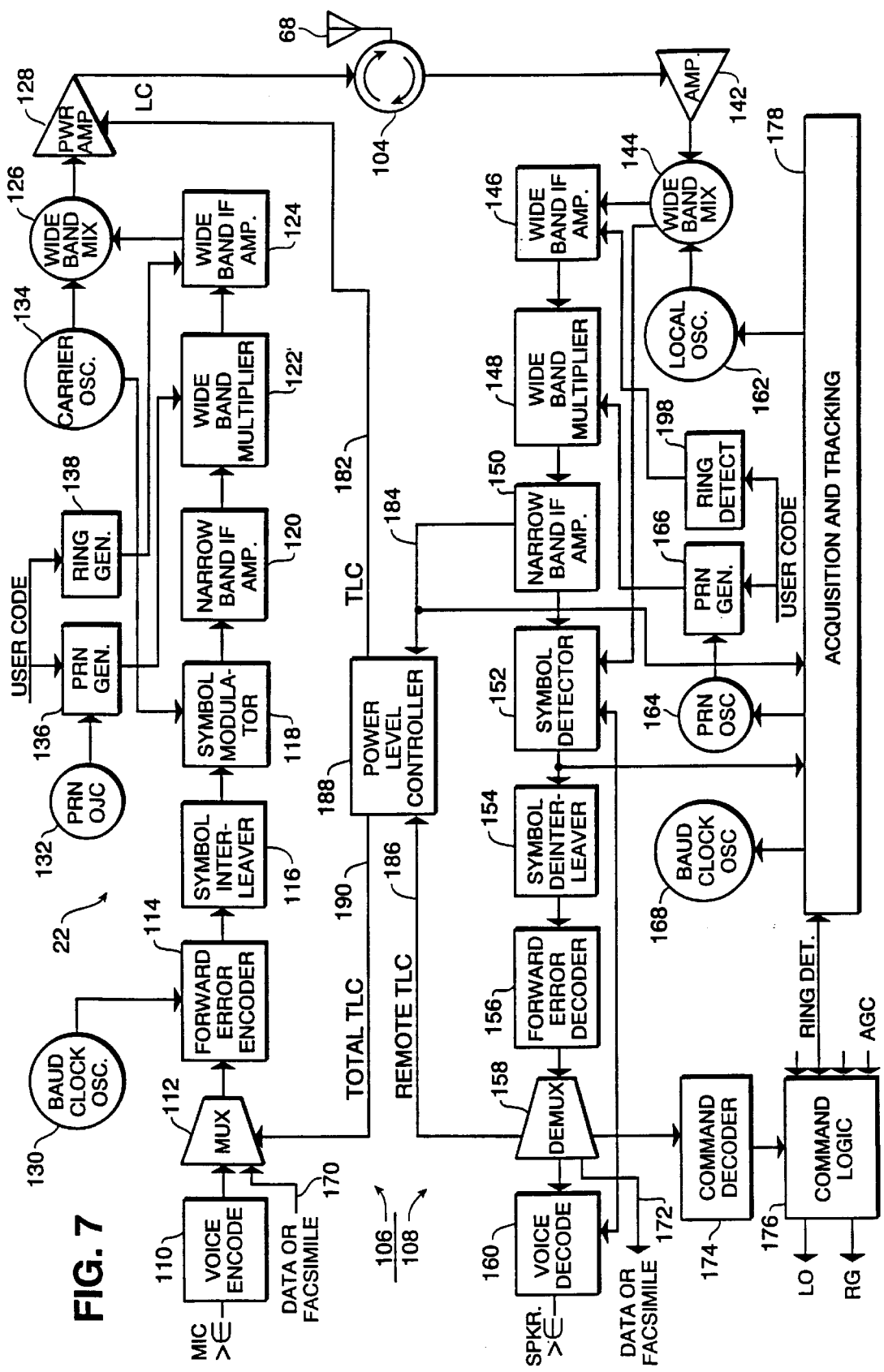
FIG. 7 is a functional block diagram of a user transceiver showing an adaptive power control system.

Referring now to FIG. 7, a functional block diagram of a typical user unit 22 is shown. The user unit 22 comprises a small, light-weight, low-cost, mobile transceiver handset with a small, non-directional antenna 68. The single antenna 68 provides both transmit and receive functions by the use of a circulator/diplexer 104 or other means. It is fully portable and whether stationary or in motion, permits access to a wide range of communication services from one telephone with one call number. It is anticipated that user units will transmit and receive on frequencies in the 1–3 Ghz band but can operate in other bands as well.

The user unit 22 shown in FIG. 7 comprises a transmitter section 106 and a receiver station 108. For the transmission of a voice communication, a microphone couples the voice signal to a voice encode 110 which performs analog to digital encoding using one of the various modern speech coding technologies well known to those skilled in the art. The digital voice signal is combined with local status data, and/or other data, facsimile, or video data forming a composite bit stream in digital multiplexer 112. The resulting digital bit stream proceeds sequentially through forward error encoder 114, symbol or bit interleaver 116, symbol or bit, phase, and/or amplitude modulator 118, narrow band IF amplifier 120, wideband multiplier or spreader 122, wide band IF amplifier 124, wide band mixer 126, and final power amplifier 128. Oscillators or equivalent synthesizers derive the bit or baud frequency 130, pseudo-random noise or "chip" frequency 132, and carrier frequency 134. The PRN generator 136 comprises deterministic logic generating a pseudo-random digital bit stream capable of being replicated at the remote receiver. The ring generator 138 on command generates a short pseudo-random sequence functionally equivalent to a "ring".

The transceiver receive function 108 demodulation operations mirror the corresponding transmit modulation functions in the transmitter section 106. The signal is received by the non-directional antenna 68 and conducted to the circulator 104. An amplifier 142 amplifies the received signal for mixing to an IF at mixer 144. The IF signal is amplified 146 and multiplied or despread 148 and then IF amplified 150 again. The IF signal then is conducted to a bit or symbol detector 152 which decides the polarity or value of each channel bit or symbol, a bit or symbol de-interleaver 154 and then to a forward error decoder 156, the composite bit stream from the FEC decoder 156 is then split into its several voice, data, and command components in the de-multiplexer 158. Finally a voice decoder 160 performs digital to analog converting and results in a voice signal for communication to the user by a speaker or other means. Local oscillator 162 provides the first mixer 144 LO and the bit or symbol detector 152 timing. A PRN oscillator 164 and PRN generator 166 provide the deterministic logic of the spread signal for despreading purposes. The baud or bit clock oscillator 168 drives the bit in the bit detector 152, forward error decoder 156 and the voice decoder 160.

The bit or symbol interleaver 116 and de-interleaver 154 provide a type of coded time diversity reception which provides an effective power gain against multipath fading to be expected for mobile users. Its function is to spread or diffuse the effect of short burst of channel bit or symbol errors so that they can more readily be corrected by the error correction code.

As an alternative mode of operation, provision is made for direct data or facsimile or other digital data input 170 to the transmitter chain and output 172 form the receiver chain.

A command decoder 174 and command logic element 176 are coupled to the forward error decoder 156 for receiving commands or information. By means of special coding techniques known to those skilled in the art, the non-voice signal output at the forward error decoder 156 may be ignored by the voice decoder 160 but used by the command decoder 174. An example of the special coding techniques are illustrated in FIG. 7 by the MUX 112 and DEMUX 158.

As shown, acquisition, control and tracking circuitry 178 are provided in the receiver section 108 for the three receive side functional oscillators 162, 164, 168 to acquire and track the phase of their counterpart oscillators in the received signal. Means for so doing are well known to those skilled in the art.

The automatic gain control (AGC) voltage 184 derived from the received signal is used in the conventional way to control the gain of the preceding amplifiers to an optimum value and in addition as an indicator of short term variations of path loss suffered by the received signal. By means to be described more in detail below, this information is combined with simultaneously received digital data 186 in a power level controller to a value such that the received value at the satellite node control is approximately constant, independent of fading and shadowing effects. The level commanded to the output power to the output power amplifier 128 is also provided 190 to the transmitter multiplexer 112 for transmission to the corresponding unit.

In mobile and other radio applications, fading, shadowing, and interference phenomena result in occasional, potentially significant steep increases of path loss and if severe enough, may result in data loss. In order to insure that the probability that such a fade will be disruptive is acceptably low, conventional design practice is to provide a substantial excess power margin by transmitting at a power level that is normally as much as 10 to 40 dB above the average requirement. But this causes correspondingly increased battery usage, inter-system, and intra-system interference. In a CDMA application, this can drastically reduce the useful circuit capacity of the channel.

A further feature of a system in accordance with the principles of the invention is an adaptive two-way power control system which continually maintains each transmitted signal power at a minimum necessary level, adapting rapidly to and accommodating such fades dynamically, and only as necessary. In controlling the transmitted signal power, the adaptive power control system in accordance with the invention comprises two main adaptive sections, the first being an adaptive path loss power control system and the second being an adaptive signal quality power control system. The adaptive power control system in accordance with the invention considers not only path loss, but also a measure of data loss of "signal quality" reported to it from another unit with which it is in communication. As used herein, "signal quality" refers to the accuracy or fidelity of a received signal in representing the quantity or waveform it is supposed to represent. In a digital data system, this may be measured or expressed in terms of bit error rate, or, if variable, the likelihood of exceeding a specified maximum bit error rate threshold. Signal quality involves more than just signal strength, depending also on noise and interference level, and on the variability of signal loss over time. Additionally, "grade of service" as used herein is a collective term including the concepts of fidelity, accuracy, fraction of time that communications are satisfactory, etc., any of which may be used to describe the quality objectives or specifications for a communication service. Examples of grade of service objective would include:

bit error rate less than one in $10^3$;

ninety percent or better score on the voice diagnostic rhyme test; and less than one-half percent probability of fade below threshold, although the exact numbers may vary depending on the application.

Power adjustment based upon path loss reciprocity alone is subject to several sources of error, including, path non-reciprocity (due to frequency difference), staleness due to transmit time delay, and local noise or interference anomalies. Compensation for all these effects is provided in the system and method of the invention by a longer term signal quality monitor, which compares recent past actual error rate statistics, (measured in the forward error correction decoder) and compares against prescribed maximum acceptable error rate statistic. The difference is interpreted as a longer-term signal level deficiency, where it is used to provide a longer term supervisory control over the short term path-reciprocity power adjustment system. Thus, for example, if a mobile terminal passes into an urban area where it suffers deep-fast fades that cannot be fully compensated due to the delay in the path reciprocity sensing power control, the longer term signal quality deficiency estimate will sense this and call for a gradual increase in the reference value calibration of the fast, signal sensing power control.

Discussing now an embodiment of the adaptive path loss power control system, each transmitter telemeters its current signal output level to the counterpart far end receiver by adding a low rate data stream to the composite digital output signal. Using this information along with the measured strength of the received signal and assuming path loss reciprocity, each end can form an estimate of the instantaneous path loss and adjust its current transmit power output to a level which will produce an approximately constant received signal level at the counterpart receiver irrespective of path loss variations.

Referring now to FIGS. 8(*a*) through 8(*h*), timing and waveform diagrams of the adaptive path loss system of an adaptive power control system in accordance with the principles of the invention are presented. In this example, the two ends of the communications link are referred to generally as A and B. In the ground cellular application, "A" corresponds to the user and "B" corresponds to the cellular node. In the satellite link, A would be the user and B would be the satellite control node; in this case, the satellite is simply a constant gain repeater and the control of its power output is exercised by the level of the signal sent up to it.

In the example of FIG. 8(a), at time 192, the path loss suddenly increases x dB due for example to the mobile user A driving behind a building or other obstruction in the immediate vicinity of A. This causes the signal strength as sensed by A's AGC to decrease x dB as shown in FIG. 8(b). The telemetered data at time 92 shown in FIG. 8(c) indicates that the level at which this signal had been transmitted from B had not been altered, A's power level controller 188 subtracts the telemetered transmitted signal level from the observed received signal level and computes that there has been an increase of x dB in path loss. Accordingly it increases its signal level output by x cB at time 192 as shown in FIG. 8(d) and at the same time adds this information to its status telemeter channel.

This signal is transmitted to B, arriving after transit time T as shown in FIG. 8(e). The B receiver sees a constant received signal strength as shown in FIG. 8(f) but learns from the telemetered data channel as shown in FIG. 8(g) that the signal has been sent to him at +x dB. Therefore, B also computes that the path loss has increased x dB, adjusts its output signal level accordingly at FIG. 8 (h) and telemeters that information. That signal increases arrives back at stations A at 2T as shown in FIG. 8(e) thus restoring the nominal signal strength with a delay of two transit times (T). Thus for a path loss variation occurring in the vicinity of A, the path loss compensation at B is seen to be essentially instantaneous while that at A occurs only after a two transit time delay, 2T.

Figure 9:
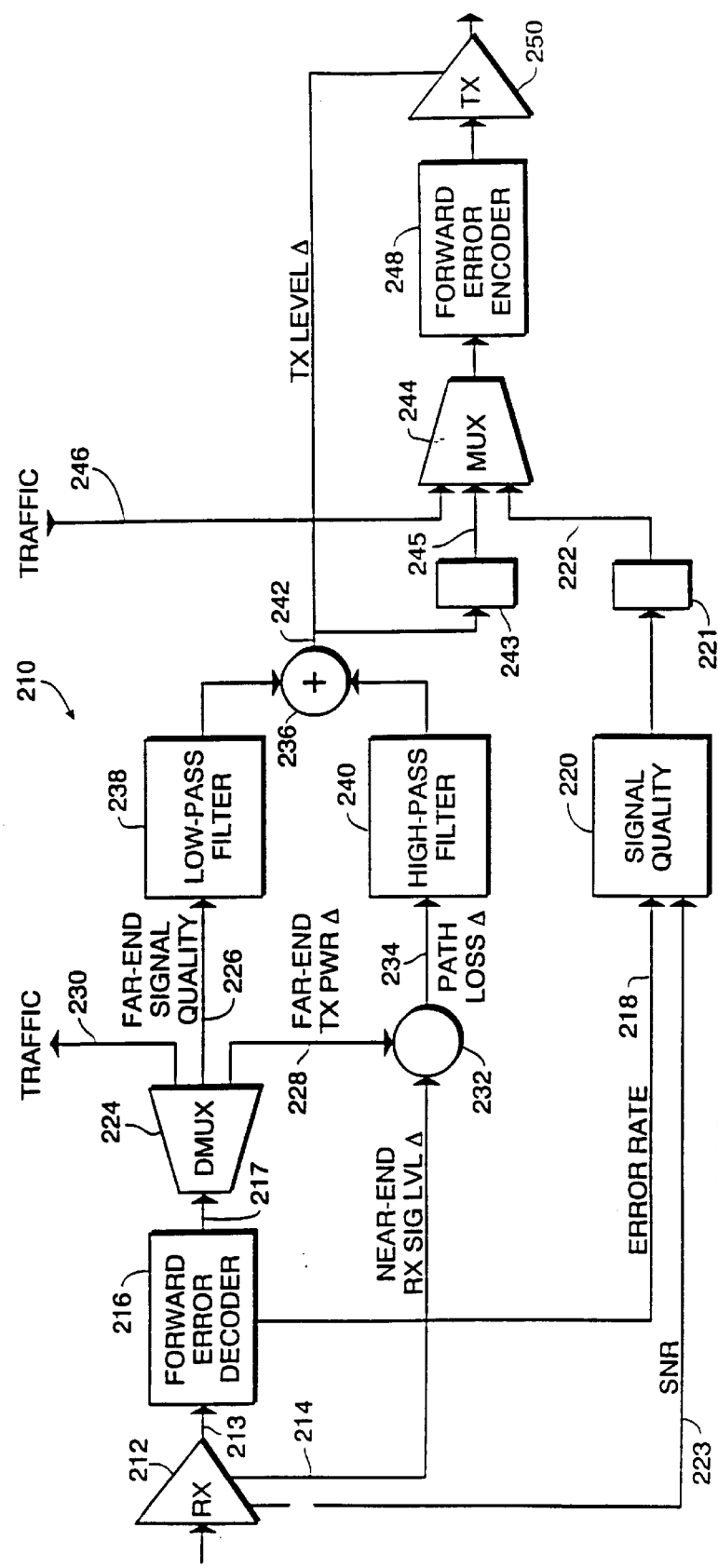
FIG. 9 is a functional diagram of a two-way power control system incorporating telemetered signal-quality deficiency supervisory control.

FIG. 9 shows the operation of an adaptive signal quality power control system acting in concert with the adaptive path loss power control system described above. While FIG. 9 depicts only one of two corresponding transceivers 210 which are in communication with each other, the one not shown functions identically to the one shown in FIG. 9 and described. Receiver 212 receives the signal from the corresponding transceiver and provides a measure indicative of the near-end received signal level deviation from a nominal level 214 by techniques well known to those skilled in the art as a step in determining the path loss. The nominal level is typically calculated to provide a desired minimum acceptable grade of service under average conditions of fading and interference, as is well known to those skilled in the art. The receiver 212 provides a digital output signal 213 based on the received signal. Forward error decoder 216 decodes the digital information in the received signal 213, and in the process provides an error rate measure 218, derived from the fraction of transmitted bits needing correction. The forward error decoded signal 218 is further processed in the signal quality circuit 220 to derive signal quality deficiency; i.e., an estimate of the change in transmit power calculated as that which would be required to just achieve the specified, minimum acceptable error rate under average conditions of fading and interference. The output from the signal quality circuit 220 is provided to an analog-to-digital converter 221 to provide a digital signal to be multiplexed 244. If the error rate is higher than acceptable, the signal quality circuit output 222 will include a power increase command signal and if the error rate is less than acceptable, a transmit power reduction will be output.

The circuit of FIG. 9 also includes a consideration of the signal-to-noise ratio (SNR) in the received signal to determine signal quality. The SNR of the received signal is determined in the receiver 212 by techniques well known to those skilled in the art; for example, the AGC is monitored, and an SNR signal 223 is provided to the signal quality circuit 220, In this embodiment, the signal quality circuit 220 considers both the error rate 218 and the SNR when producing its output control signal 222.

A demultiplexer 224 separates the telemetered data 217 output through the forward error decoder 216 as to far-end signal quality deficiency 226, far-end transmitter power deviation reference 228 from a nominal level, and the traffic signals 230. The far-end transmit power deviation signal 228 is combined 232 with the near-end received signal level deviation 214 to yield a signal 234 representative of the path loss deviation from a nominal reference value. The telemetered far-end signal quality deficiency 226 and the path loss deviation 234 are combined 236 through complementary filters 238 and 240 to yield the transmit power control signal 242 for controlling the output power of the associated transmitter 250. The transmit power control signal 242 is also applied to an analog-to-digital converter 243 to provide a digitized transmit power control signal 245. The resulting transmitter power level deviation from nominal reference 245 and the near-end signal quality 222 deficiency signals are multiplexed 244 with the traffic 246, then forward error encoded 248 and transmitted 250 to the far end transceiver in support of identical functions performed there. The complementary combining filters 238 and 240 can be designed as optimal estimating filters based upon knowledge of the power requirement signal and measurement error statistics using methods well known to those familiar with estimation theory.

Referring again to FIG. 7, an arrangement is provided for generating call requests and detecting ring signals. The ring generator 138 generates a ring signal based on the user's code for calling out with the user unit 22. For receiving a call, the ring signal is detected in a fixed matched filter 198 matched to a short pulse sequence which carries the user's unique code. By this means each user can be selectively called. As an option, the ring detect and call request signals may be utilized in poll/response mode to provide tracking information on each active or standby mode user. Course tracking information, adequate for management of the call routing functions is provided by comparison of signal quality as received at various modes. For the precision location option, the user response signal time is accurately locked to the time of receipt of the polling or timing signal, to a fraction of a PRN chip width. measurement of the round trip poll/response time from two or more nodes or time differences of arrival at several nodes provides the basic measurement that enable solution and provision of precise user position. Ground and satellite transmitters and receivers duplicate the functions summarized above for the user units. Given a priori information, for example as to the route plan of a vehicle, a single round trip poll/response time measurement from a single node can yield valuable user position information.

The command logic 176 is further coupled to the receiver AGC 180, the matched filter ring detector (RD) 198, the acquisition and tracking circuitry 178, the transmit local oscillator (LO) 162 and the ring generator (RG) 138 to command various modes of operation.

The economic feasibility of a mobile telephone system is related to the number of users that can be supported. Two significant limits on the number of users supported are bandwidth utilization efficiency and power efficiency. In regard to bandwidth utilization efficiency, in either the ground based cellular or mobile satellite elements, radio frequency spectrum allocation is a severely limited commodity. Measures incorporated in the invention to maximize bandwidth utilization efficiency include the use of code division multiple access (CDMA) technology which provides an important spectral utilization efficiency gain and higher spatial frequency reuse factor made possible by the user of smaller satellite antenna beams. In regard to power efficiency, which is a major factor for the satellite-mobile links, the satellite transmitter source power per user is minimized by the use of forward-error-correcting coding, which in turn is enabled by the above use of spread spectrum code division multiple access (SS/CDMA) technology and by the use of relatively high antenna gain on the satellite. CDMA and forward-error-correction coding are known to those skilled in the art and no further details are given here.

The issue of bandwidth utilization efficiency will now be considered in detail. The major contribution of SS/CDMA to spectral efficiency is closely related to the concept of cellular "cluster". In existing Frequency Division or Time division multiple access technology, a given frequency or time slot allocation must be protected from interference from nearby cells by users on the same frequency sub-band. Depending on the degree of protection required, it may be necessary to preclude the reuse of the cell "X"frequencies on a number of cells, N, surrounding "X". That number is called the "cluster size." Because each cell can then utilize only one Nth of the total allocatable channels, it will be seen, all other things being equal, that the "frequency reuse factor" and spectral utilization efficiency are inversely proportional to the cluster size, N.

Field tests of the FM-frequency division multiplex ground cellular system, Macdonald, V. H., *The Cellular Concept,* Bell Systems Technical Journal, p. 15, January 1979, determined that a signal-to-interference ratio of 17 dB or better is required for good to excellent quality to be perceived by most listeners. This, combined with propagation and fading studies, yielded the criterion that the separation between co-channel sites should be at least 6.0 times the maximum distance to a user within the cell using omni-directional antennas at the ground nodes. In order to achieve this separation, the cluster size must be at least N=12 cells per cluster. Thus one may use only $\frac{1}{12}$ of the total allocatable capacity per cell.

In satellite service, the minimum cell size is inversely proportional to the satellite antenna dish diameter. For a given maximum feasible satellite antenna dish diameter, the number of available channels is strictly limited by the cluster size. In the planned AMSC system, C. E. Agnew, et al., *The AMSC Mobile Satellite System,* Proceedings of the Mobile Satellite Conference, NASA, JPL, May 1988, the effective cluster size is 5, and one may use only $\frac{1}{5}$ of the total allocatable capacity per cell.

In a system in accordance with the invention, the cluster size is one. That is, each cell uses the same, full allocated frequency band. This is possible because of the strong interference rejection properties of spread spectrum code division multiple access technology (SS/CDMA). The effect of users in adjacent cells using the same band is qualitatively no different than that of other users in the same cell, so may be taken into account as an effective reduction in the number of users that can be tolerated within a cell. The cumulative effect of all such other-cell interferers may be calculated on the assumption of uniform density of users and a distance attenuation law appropriate to the case of ground propagation or satellite beam pattern. Doing so, we find the multiplying factor for the ratio of total interference to in-cell origin interference of 1.4 for ground propagation and 2.0 for the satellite system. This factor may be accounted for as a multiplier equivalent in effect to an effective cluster size for the CDMA system. Thus, finally, it is believed that in comparison with other systems we find frequency reuse factor or bandwidth utilization efficiency factors inversely proportional to effective cluster size in the ratios:

$$0.71:0.5:0.2:0.08$$

for respectively the ground cellular component of the invention, satellite cellular component of the invention, the AMSC mobile satellite concept, and current ground cellular technology.

The second severely limited commodity in the satellite links is satellite prime power, a major component of the weight of a communication satellite and thereby a major factor in satellite cost. Generally in systems such as this, the down links to individual users are the largest power consumers and thus for a limited satellite source power, may provide the limiting factor on the number of users that can be served. Thus it is important to design the system for minimum required power per user. This requirement is addressed in the invention in four ways. In the invention the system envisages the user of the highest feasible satellite antenna gain. In one embodiment, power gain on the order of 45 dB and beamwidth of under one-degree are envisioned at L-band. This is accomplished by an antenna size of approximately 20 meters.

Secondly, by virtue of the use of the spread spectrum technique, very low rate high gain coding is available without penalty in terms of increased bandwidth occupancy.

Thirdly, the system utilizes channel bit interleaving/de-interleaving, a kind of coded time diversity to provide power gain against deep fading nulls. This makes it possible to operate at relatively low bit energy to noise density ratio, on the order of 3 dB. This in turn results in minimum satellite power requirements per user.

Fourthly, two-way, adaptive power control and signal quality control as previously described obviate the usual practice of continuously transmitting at a power level which is 10 to 40 dB greater than required most of the time in order to provide a margin for accommodating infrequent deep fades.

In addition to the above listed advantages, the Code Division Multiplex system has the following important advantages in the present system. Blank time when some of the channels are not in use reduces the average interference background. In other words, the system overloads and underloads gracefully. The system inherently provides flexibility of base band rates; as opposed to FDM system, signals having different baseband rates can be multiplexed together on an ad-hoc basis without complex preplanned and restrictive sub-band allocation plans. Not all users need the same baseband rate. Satellite antenna sidelobe control problems are significantly reduced. The above mentioned numerical studies of out-of-cell interference factors show that secondary lobe responses may effectively be ignored. Co-code reassignment (that is reuse of the same spreading code) is feasible with just one beam separation. However, because there are effectively (i.e., including phasing as a means of providing independent codes) an unlimited number of channel codes, the requirements on space division are eased; there is no need to reuse the same channel access i.e., spreading code.

By virtue of the above discussed design factors the system in accordance with the invention provides a flexible capability of providing the following additional special services: high quality, high rate voice and data service; facsimile (the standard group 3 as well as the high speed group 4); two way messaging, i.e, data interchange between mobile terminals at variable rates; automatic position determination and reporting to within several hundred feet; paging rural residential telephone; and private wireless exchange.

It is anticipated that the satellite will utilize geostationary orbits but is not restricted to such. The invention permits operating in other orbits as well. The system network control center 12 is designed to normally make the choice of which satellite or ground node a user will communicate with. In another embodiment, as an option, the user can request his choice between satellite link or direct ground based link depending on which provides clearer communications at the time or request his choice based on other communication requirements.

While a satellite node has been described above, it is not intended that this be the only means of providing above-ground service. In the case where a satellite has failed or is unable to provide the desired level of service for other reasons, for example, the satellite has been jammed by a hostile entity, an aircraft or other super-surface vehicle may be commissioned to provide the satellite functions described above. The "surface" nodes described above may be located on the ground or in water bodies on the surface of the earth. Additionally, while users have been shown and described as being located in automobiles, other users may exist. For example a satellite may be a user of the system for communicating signals, just as a ship at sea may or a user on foot.

Figure 15:
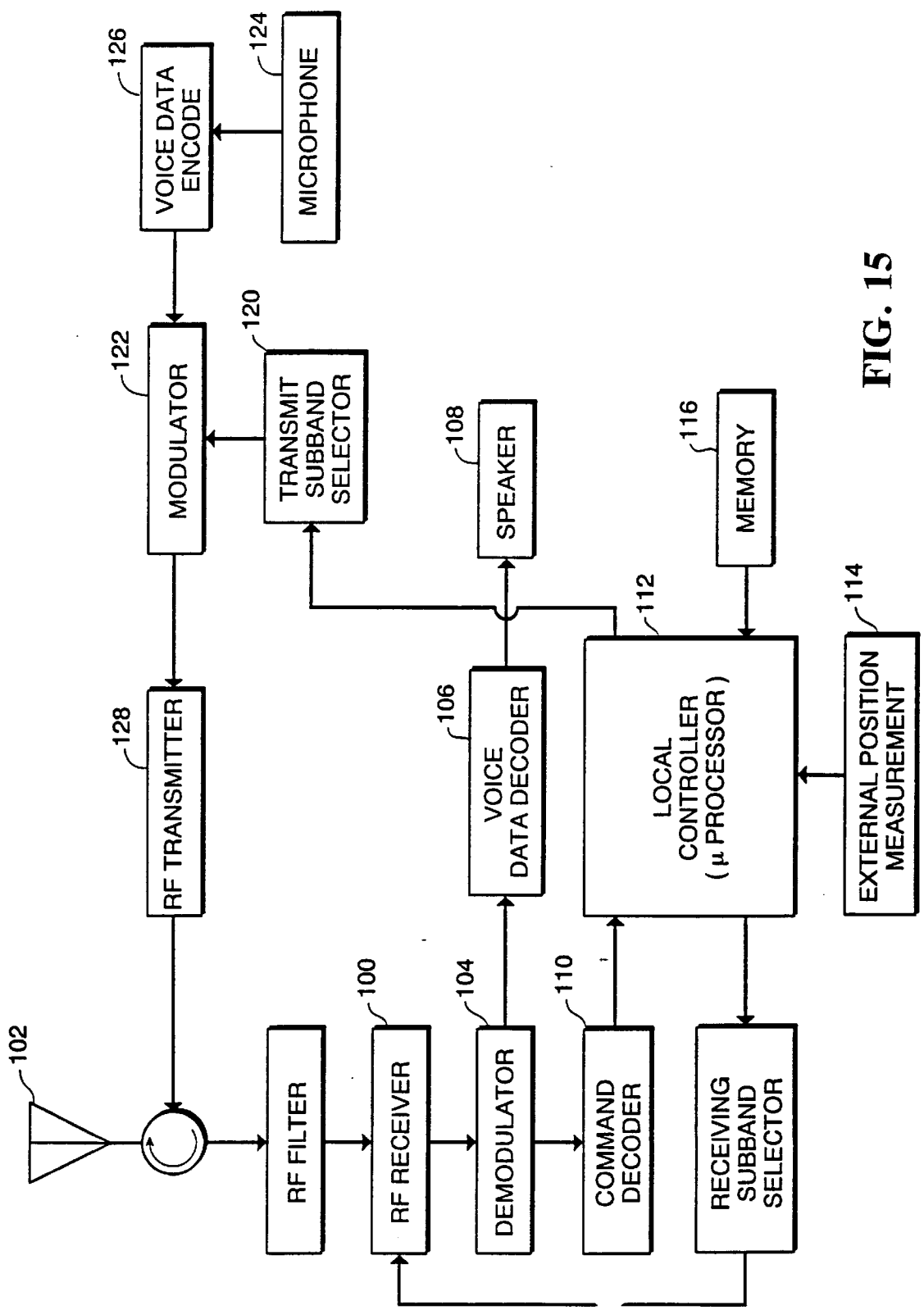
FIG. 15 is a generalized block diagram of a user unit with external position measurement.

Accurate position determination can be obtained through two-dimensional multi-lateration. Each CDMA mobile user unit's transmitted spreading code is synchronized to the epoch of reception of the pilot signal from its current control site, whether ground or satellite node. The normal mode of operation will be two-dimensional, i.e., based upon two receptions, at ground or satellite nodes of the user response code. In conjunction with a priori information inherent in a topographic database, e.g., altitude of the surface of the earth, position accuracy to within a fraction of a kilometer can be provided. Other means are available for position location, such as GPS, see FIG. 15.

Means for determining the position of a mobile user relative to a multiplicity of known system nodes, either fixed on the ground or at known positions in space, are known to those skilled in the art. In a CDMA of system, any of these means are largely incidental to the function of transmitting and/or receiving the CDMA signal at multiple sites. The receiving function requires synchronization of the epoch of a local spread code generator to that of the received spread code, so that having achieved code synchronization, one inherently has a measure of the delay time and hence the range of the signal. Various references describe how this information can be used in several different geometrical configurations to provide the delay measurements necessary to provide hyperbolic, elliptical, spherical or hybrid multi-lateration position determination. By any of these means the mobile position can either be determined by the network controller or by the mobile user and relayed to the network controller.

Signal theft or "pirating" is a major problem in current cellular and TV receive only (TVRO) systems, and will probably affect additional future communications systems. Pirates manage to learn a code intended to restrict the system use to the authorized customers for whom it was intended, and then to alter users units such that they become pirate units which operate using the stolen code. Thus, unlawful use of the system is accomplished and the pirate user does not pay the fees due to the service provider. In the past, such pirates have been amazingly successful at their unlawful trade, both in terms of speedy delivery to their markets and the value of stolen signals. Such piracy continues on a large scale today.

This invention utilizes the knowledge of a users position, obtained as described above, first to verify the legitimate, authorized users unit. The remaining units operating on that code are clearly identified as non paying or pirate users by virtue of having a different position. In one embodiment, this information is used to apprehend the pirates.

In an alternate embodiment, the pirated unit can be disabled. There are two embodiments for disabling the pirated unit, each being effective under different circumstances. The first involves simply not providing service. The second involves commanding the disablement of the pirated unit by means including commanding that fuses to be blown within the circuitry and commanding the destruction of the user circuitry.

Figure 16:
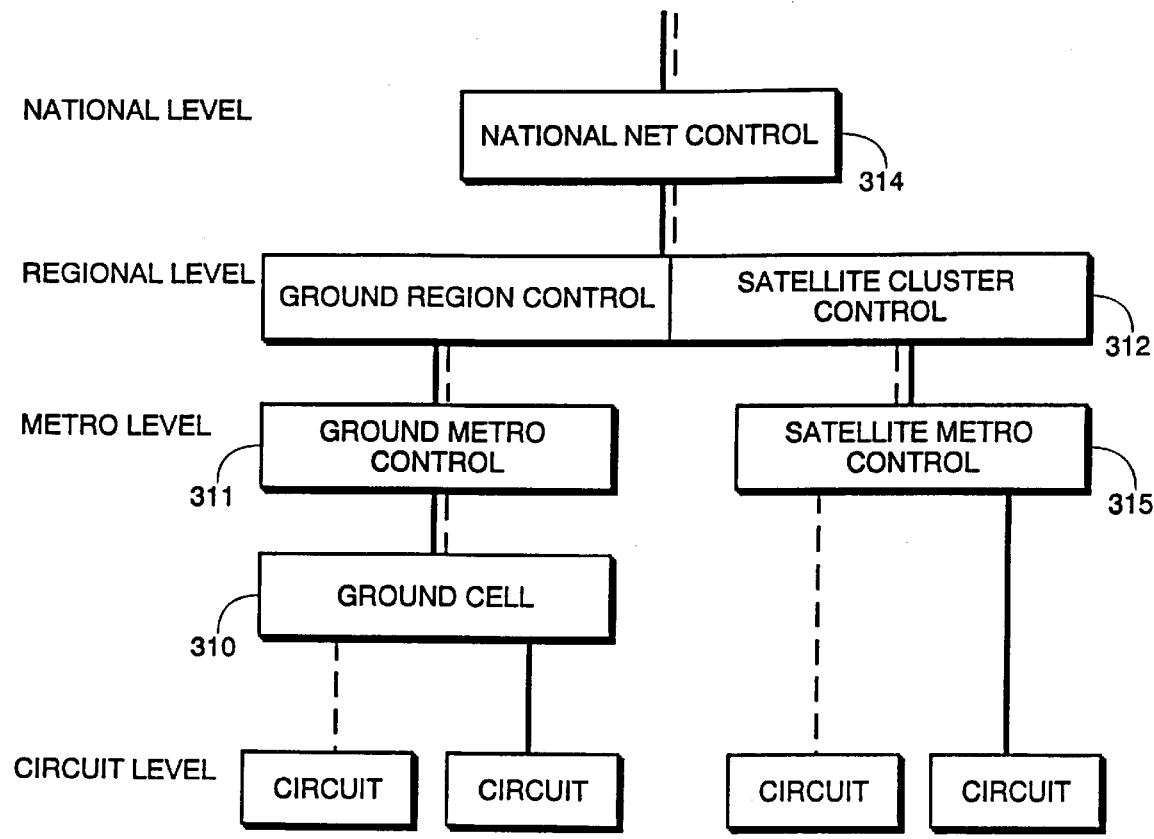
FIG. 16 depicts a method of control hierarchy for a hybrid satellite and ground based mobile communication system.

FIG. 16 depicts a hierarchial control division along geographical and ground vs. satellite elements of a mobile system. In this diagram solid lines denote traffic flow, dotted lines command, status and control flow.

The total number of national, much less worldwide circuits is so vast that maximum decentralization of control is desired and accomplished by this control hierarchy invention. Every command and allocation decision should be made at the lowest level at which all the necessary information to make the decision is available. Thus it is anticipated that the bulk of the service requests and handovers coming upward into a particular level will be resolved at that level, with only those involving higher or lateral coordination being passed on up the line. A numerical example of a system using this control hierarchy follows.

A typical ground cell 310 is assumed to comprise two 1.25 MHz subbands, each serving up to 54 circuits for a total of 108. These are the common ground cells. Geographically they may be thought of as from 3 to 12 miles in diameter. About 6 of the 108 circuits are reserved for calling channels. Power control functions with ground cellular users are the only functions handled here. No other switching or control functions are performed here, but all traffic lines are trunked on up the line along with station status.

Depending on local demographics, up to about 50 (more typically 20) such ground cell trunks comprise a GND METRO control 311, or Mobile Telephone Switching Office (MTSO). This would correspond roughly with a metropolitan area such as greater Los Angeles. Local calls and handovers within the ground metro area would be resolved and controlled at this level. As a mobile user travels towards the edge of the metro area this will be recognized by the fact that he is being served by one of the outer rank of "edge" cells. For any user in these cells any signal drop requiring handover will be coordinated at regional level with the appropriate adjacent metro or satellite cell. Generally the GND METRO regions will be made coterminous with the satellite cells provided there are any ground cells within the satellite cell.

The SATELLITE CELLS corresponding to satellite beams, might be about 200 mi (normal to beam) in diameter, and provide about 741 circuits of which some 200 are calling channels. Control functions correspond to those of the Ground cell.

The REGIONAL control 312 areas in one embodiment are coterminous with the satellite "Clusters", typically about 10 satellite cells or about 600 miles diameter. Each may handle 1 to 100 (typically 15) METRO regions.

The SATELLITE CLUSTER CONTROL as part of the regional control handles about 10 satellite cells. The facility is collocated with the Ground Regional Control facility.

The NATIONAL NET CONTROL 314 handles about 15 Regional centers for the case of a United States National system. This comprises all of the facilities envisioned in the present application.

Control functional allocation among these various control levels can be as follows:

Ground Cell 310 and Satellite Cell 315: Power control, Time-of-Arrival measurement and reporting as assigned (basis for position determination), detect monitor and report up all current standbys and call requests, and call terminations in coverage area, handle traffic as assigned including handshaking and call establishment, and disconnect. Each cell has a level at which saturation occurs, i.e., a limit on how many bits of information can be communicated through that node. The instantaneous information being transmitted through any node can be measured by the instantaneous output power level at each of the transmitters associated with each node, and/or the instantaneous received power level at each of the receivers associated with each node. Alternatively, the number of calls being instantaneously handled is known at the control centers. A measure of this information can be sent to any or all users such that they could delay transmission until a time when the use is low and hence receive more favorable rates. The information can be displayed by lamps or LCD or other means to permit manual decision making, e.g., whether or not to place a call. In an alternative embodiment, the information could be automatically used to enable transmission, e.g., for data or fax transmission.

Ground Metro Control 311: Coordinates soft handovers between ground cells, TELCO interface for ground links.

Regional Control 312: Provides TELCO interface to satellite links, tracks position of all active or standby units in region; assigns traffic handling facility and subband (coordinating exclusion areas), and forwards up requests for handovers out of the region and requests for additional resources for position fixing.

National Control 314: in one embodiment provides; Satellite status monitoring; orbit maintenance, power; management, spares control; satellite housekeeping; coordinates position fixing resources as requested; and coordinates interregional handovers.

Figure 17:
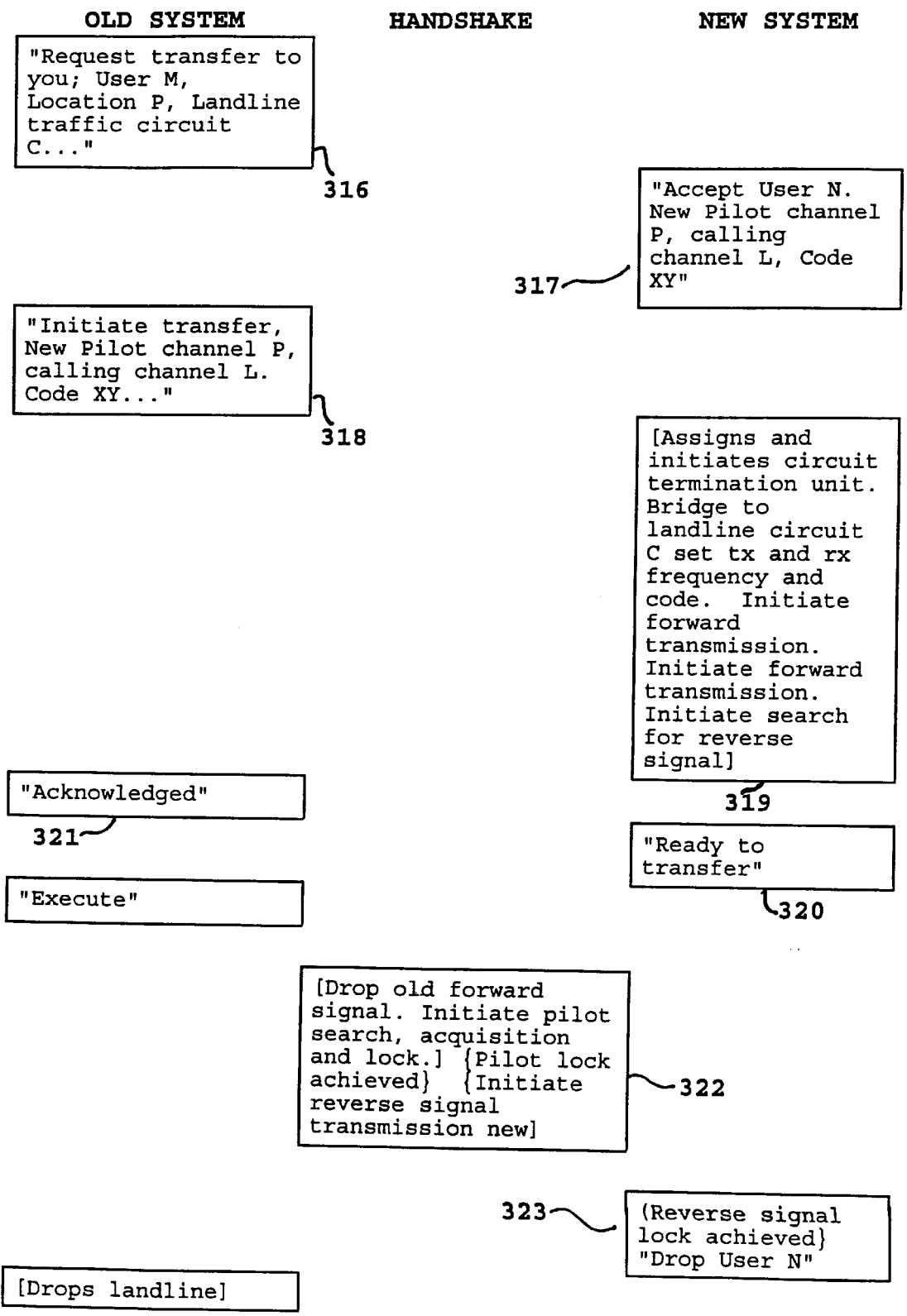
FIG. 17 is a diagram of a protocol for hand-over of a mobile user from one node to another.

One embodiment of a method and protocol for the handover of a mobile user from one operator to another is described below (with reference to FIG. 17):

1. There is established an agreed upon uniform algorithm whereby either the user or the operator could determine which would be the preferred service for any user at any time as a function of:
   a) User's present location;
   b) Present loading and spare capacity status of PCS and satellite systems (signalled between systems);
   c) User preferences, as established by his service option choices, which would be a set of properties, (a service "mask") in his subscriber database; and/or
   d) Present user signal quality.

2. This algorithm is periodically (e.g., every few seconds) tracked and recomputed by the current, or "old" service provider.

3. Whenever the recomputed algorithm should call for a transfer from "old" to any other, "new" service provider, the following events would occur:
   a) Old provider sends a formatted message 316 to new provider, meaning:
      "Request transfer to your system of User N at location XYZ, now connected to user K, code assignments UVW, whose traffic is hereby being bridged to you via landline circuit PDQ of trunk ABC". . . and any other information that may be useful in call setup on new system.
   b) New system sends message 317 to old meaning:
      "call can be accepted, assign calling channel L, code XY, subband S . . . "
   c) Old system sends a command 318 to subscriber set:
      "Initiate transfer to new system on new system calling channel L, code XY, subband S . . . " and any other information which would expedite the transfer.
   d) New system assigns a termination unit to acquire user N on his calling channel L, code XY, subband S . . . and makes the landline connection to circuit PDQ of trunk ABC . . . 319.
   e) Subscriber and new system do as much as possible of call initiation handshaking i.e., "initial setup", while maintaining traffic via old system. In one embodiment the other (non-handling-over) party is connected and the forward direction signals are being transmitted from both old and new systems simultaneously in parallel; the necessary user command signals (like new frequency, new spreading code, . . . ) have been sent to him and are stored in registers ready to be but not yet executed; and the new reverse direction receiver terminal unit is assigned, standing by, searching for the anticipated signal code, and its output bridged into the reverse direction landline to the other party.
   f) When initial setup is all ready and standing by, new system messages 320 old system:
      "Ready to transfer."
   g) Old system signals 321 to subscriber unit
      "Execute".
   h) Subscriber unit while continuing reverse direction transmission to old system, instantly drops receive tracking of old forward signal, and commences receive search to new pilot signal in assigned new frequency band and code 322. When lock is achieved, normally several 20 ms frames later, transfers reverse transmission to new band and codes. In one embodiment the transfer command to the user is synchronized to breaks in the forward direction utterances to minimize user perceived disruption, and similarly, after the subscriber unit achieves lock and sync on the new pilot, his transmission transfer is delayed to the next break in his utterances. In this manner it may be that the several tens of milliseconds required for resync can be made essentially transparent to both user and other party.
   i) When new system achieves lock-on to user's reverse transmission 323, new system signals old system to drop the connection.

While several particular forms of the invention have been illustrated and described, it will be apparent that various modifications can be made without departing from the spirit and scope of the invention. Accordingly, it is not intended that the invention be limited, except by the appended claims.

Having described the invention in such terms as to enable those skilled in the art to make and use it, and having identified the presently preferred best modes thereof, we claim:

1. In the operation of a wireless communications system, which system includes at least two cellular nodes as to establish at least two cells, and a plurality of user units, each said user unit including means for establishing selective communication between at least one node and the user unit, the improvement for reducing use of said system by an unauthorized user comprising:

a) establishing the geographical location of a selected user including;
   i) providing a timing signal to the user unit from at least one node;
   ii) providing a timing response signal from the user unit in response to the timing signal;
   iii) receiving the timing response signal by at least two nodes;
   iv) measuring the response times of the user unit to the timing signal based on receipt of the timing response signal by at least two nodes; and
   v) determining the position of the user unit based on the round trip time of transmission of the timing signal and receipt of the timing response signal by at least two nodes;
b) comparing the location of said selected user with the known locations of authorized users; and
c) denying service to said selected user if said selected user's location does not correspond to one of said known locations.

2. In a communication system having a plurality of user units and at least two cellular nodes so as to establish at least two cells, the improved cellular communication system comprising:

a) position determination means for establishing the geographical location of a selected user, said position determination means including;
   i) timing signal means for providing a timing signal to the user unit from at least one cellular node;
   ii) timing response signal means for providing a timing response signal from the user unit to at least two nodes in response to said timing response signal;
   iii) timing measurement means for measuring the response times of the user unit to each timing signal received by at least two nodes; and
b) logic means for comparing the location of said selected user with the known locations of authorized users; and
c) fraudulent detection means for determining whether said selected user is a fraudulent user of the communication system.

* * * * *